(12) United States Patent
Imura

(10) Patent No.: US 8,063,596 B2
(45) Date of Patent: Nov. 22, 2011

(54) APPARATUS FOR CARRYING OUT IMPROVED CONTROL OF ROTARY MACHINE

(75) Inventor: Akihiro Imura, Aichi-ken (JP)

(73) Assignee: Denso Corporation, Kariya (JP)

( * ) Notice: Subject to any disclaimer, the term of this patent is extended or adjusted under 35 U.S.C. 154(b) by 363 days.

(21) Appl. No.: 12/491,765

(22) Filed: Jun. 25, 2009

(65) Prior Publication Data

US 2009/0322264 A1  Dec. 31, 2009

(30) Foreign Application Priority Data

Jun. 25, 2008  (JP) .................................. 2008-166385

(51) Int. Cl.
  H02P 1/04  (2006.01)
  H02P 6/00  (2006.01)
  H02P 21/00  (2006.01)
  H02P 6/12  (2006.01)
  H02P 6/14  (2006.01)
  H02P 7/00  (2006.01)
  H02P 27/00  (2006.01)
  G05B 11/28  (2006.01)

(52) U.S. Cl. ......... 318/400.09; 318/400.01; 318/400.02; 318/400.15; 318/400.26; 318/400.27; 318/432; 318/434; 318/599; 318/811

(58) Field of Classification Search ............. 318/400.01, 318/400.02, 400.09, 400.15, 400.26, 400.27, 318/432, 434, 599, 811

See application file for complete search history.

(56) References Cited

U.S. PATENT DOCUMENTS

| 2005/0046369 A1* | 3/2005 | Kobayashi et al. ........... 318/432 |
| 2006/0049792 A1* | 3/2006 | Chen et al. .................... 318/716 |
| 2007/0216339 A1* | 9/2007 | Yoshimoto et al. ........... 318/800 |
| 2007/0241703 A1* | 10/2007 | Yamada et al. ............... 318/254 |
| 2008/0111516 A1* | 5/2008 | Inokuma ....................... 318/799 |
| 2008/0211450 A1* | 9/2008 | Yamada et al. ............... 318/801 |
| 2009/0058337 A1* | 3/2009 | Kato et al. ............... 318/400.09 |

(Continued)

FOREIGN PATENT DOCUMENTS

JP  9-047100  2/1997

(Continued)

OTHER PUBLICATIONS

Japanese Office Action dated Mar. 30, 2010, issued in corresponding Japanese Application No. 2008-166385, with English translation.

*Primary Examiner* — Bentsu Ro
*Assistant Examiner* — Gabriel Agared
(74) *Attorney, Agent, or Firm* — Nixon & Vanderhye PC

(57) ABSTRACT

In an apparatus, a first drive unit drives, in a first range of a voltage utilization factor, a switching member to thereby control an output voltage of the power converter to be matched with a command voltage. A second drive unit drives, in a second range of the voltage utilization factor, the switching member to thereby generate a value of a controlled variable of a rotary machine. The second range of the voltage utilization factor is higher than the first range thereof. An estimating unit estimates, during the switching member being driven by the second drive unit, a value of a parameter associated with the output voltage of the power converter. The estimated value is required for the first drive unit to generate the value of the controlled variable generated by the second drive unit.

19 Claims, 20 Drawing Sheets

U.S. PATENT DOCUMENTS

2009/0224627 A1 * 9/2009 Hino et al. ............. 310/216.077

FOREIGN PATENT DOCUMENTS

| JP | 11-285288 | 10/1999 |
| JP | 2000-092884 | 3/2000 |
| JP | 2002-223590 | 8/2002 |
| JP | 2005-039964 | 2/2005 |
| JP | 2005-218299 | 8/2005 |
| JP | 2007-143235 | 6/2007 |
| JP | 2008-011625 | 1/2008 |

* cited by examiner iq-TORQUE CHARACTERISTIC iq-Vd CHARACTERISTIC

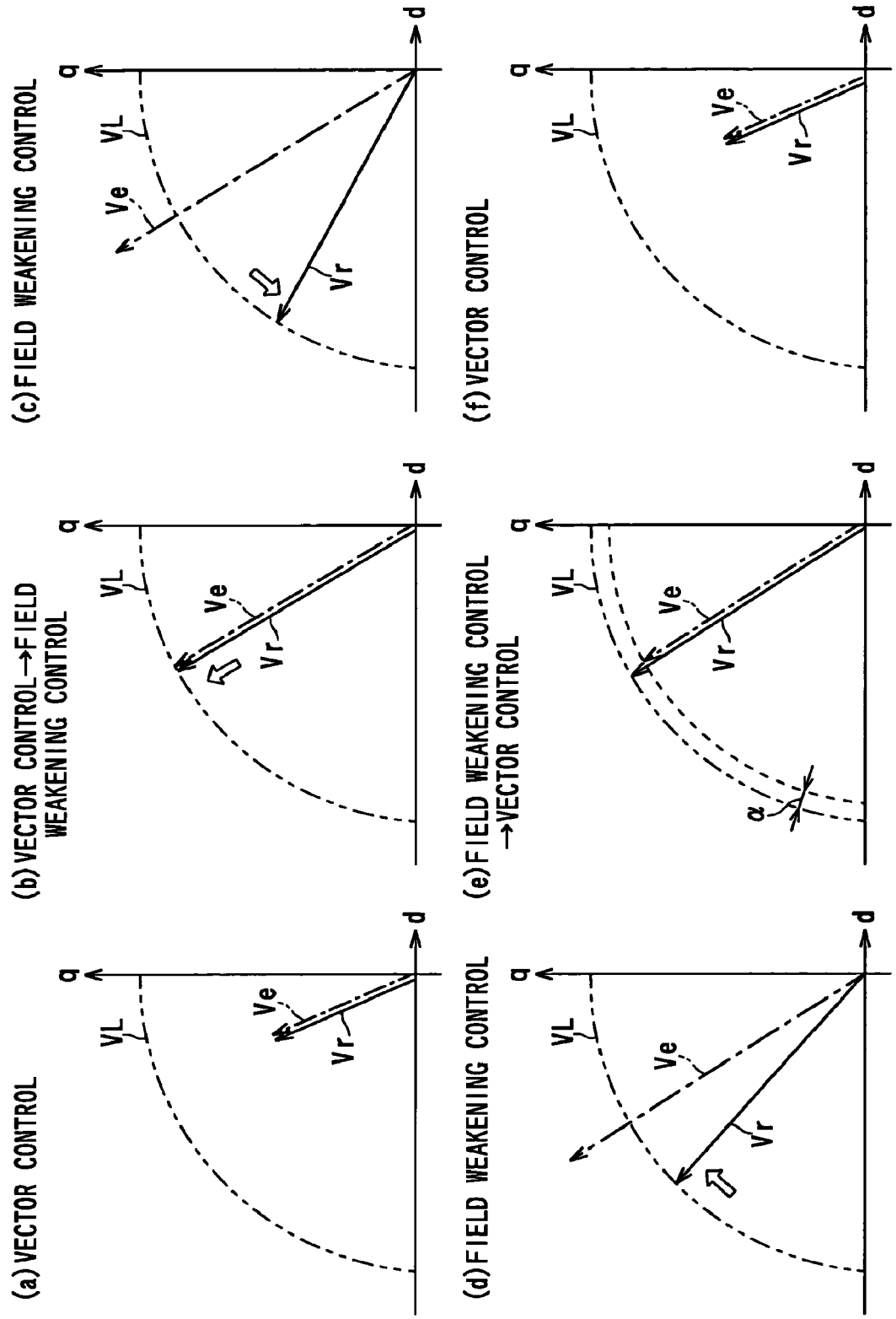

(I) LOAD 0% ⟷ 100%
(II) 50% ⟷ 100%

$$Vref = \sqrt{Lq^2 iq^2 + (Ld\, id + \phi)^2}$$

$$VLq = \sqrt{(1+x)^2 Lq^2 iq^2 + (Ld\, id + \phi)^2}$$

$$VLd = \sqrt{Lq^2 iq^2 + \{(1+x)Ld\, id + \phi\}^2}$$

$$V\phi = \sqrt{Lq^2 iq^2 + (Ld\, id + (1+x)\phi)^2}$$

APPARATUS FOR CARRYING OUT IMPROVED CONTROL OF ROTARY MACHINE

CROSS REFERENCE TO RELATED APPLICATIONS

This application is based on Japanese Patent Application 2008-166385 filed on Jun. 25, 2008. This application claims the benefit of priority from the Japanese Patent Application, so that the descriptions of which are all incorporated herein by reference.

FIELD OF THE INVENTION

The present invention relates to apparatuses for driving a power converter having a switching element and operative to establish electrical connection between a terminal of a rotary machine and a DC (Direct Current) power supply unit therethrough to thereby control at least one controlled variable of the rotary machine.

BACKGROUND OF THE INVENTION

A type of such control apparatuses set forth above is designed to carry out current feedback control to thereby adjust an actual value of at least one controlled variable of a rotary machine to a request value thereof. A typical control apparatus of this type operates in a PWM (Pulse Width Modulation) control mode for switching elements of an inverter as an example of power converters.

The control apparatus for a three-phase motor operates in the PWM control mode to calculate a substantially sinusoidal command voltage for each phase winding of the three-phase motor; this command voltage is required to match an actual current flowing through each phase winding and fed back therefrom with a desired periodic command current.

The control apparatus operates in the PWM control mode to compare the sinusoidal command voltage for each phase winding with a triangular (or saw-tooth) carrier wave. Based on the result of the comparison, the control apparatus operates in the PWM mode to individually switch on and off each of bridge-configured switching elements of an inverter based on the result of the comparison. This modulates an input DC voltage to the inverter into an AC (Alternating Current) voltage to be applied to each phase winding of the rotary machine.

Adjustment of the on and off durations, that is, the duty (duty cycle) of each of the bridge-configured switching elements by the control apparatus matches the AC voltage to be applied to each phase winding with the command voltage therefor. This matches the actual current flowing through each phase winding to a desired periodic command current. The actual current flowing through each phase winding works to generate, as the at least one control variable, a torque corresponding to the desired command current for each phase winding.

The PWM control mode for a three-phase motor needs to increase the command voltage in a higher velocity range of the three-phase motor. The bridge-configured inverter limits an upper limit of the amplitude of the command voltage to substantially the half of the input DC voltage to the inverter. This is because the substantial half of the input DC voltage to the inverter is applied to each phase winding.

Thus, when the command voltage increases in amplitude to be greater than the half of the inverter input DC voltage, an actual output voltage of the inverter cannot be matched with the command voltage.

Thus, in a higher velocity range of a three-phase motor, using a single-pulse control mode in place of the PWM control mode has been implemented. For example, Japanese Patent Application Publications No. 2002-223590 and 2005-218299 disclose control apparatuses operating in the single-pulse control mode.

A control apparatus operates in the single-pulse control mode in a higher velocity range of the three-phase motor to individually switch on and off each of the switching elements of the inverter such that the on and off cycle of each of the switching elements is substantially matched with the period of the periodic command current; this period corresponds to an electric angle of $2\pi$ radians.

The control apparatus that operates in the single-pulse control mode in a higher velocity range of the three-phase motor provides a voltage utilization factor greater than that obtained when it operates in the PWM control mode in the higher velocity range. The voltage utilization factor is a ratio of an RMS value of a line-to-line voltage of the three-phase motor to an inverter input voltage.

However, the single-pulse control mode abruptly, that is, discontinuously increases the voltage utilization factor from the value obtained at the moment when the amplitude of the command voltage for the PWM control mode reaches the half of the input DC voltage to the inverter.

An additional control method for continuously shifting inverter control from the PWM control mode to the single-pulse control mode is disclosed in Japanese Patent Application Publication No. H09-047100.

The method disclosed in the Patent Publication No. H09-047100 is designed to, when the amplitude of the command voltage for the PWM control mode reaches the half of the inverter input DC voltage, use a pattern of periodic repetitive pulses stored in a ROM and a phase of a vector of the command voltage in a d-q coordinate system. The d-axis of the d-q coordinate system is in line with a rotor N pole center of a three-phase motor, and the q-axis thereof has a phase of $\pi/2$ radian electric angle leading with respect to a corresponding d-axis during rotation of the three-phase motor.

The method is also designed to switch on and off each of the bridge-configured switching elements in accordance with the pattern of periodic repetitive pulses stored in the ROM.

Specifically, the method is designed to, when the norm of a vector of the command voltage is equal to or greater than a preset value, shift the control mode for the inverter from the PWM control mode to the single-pulse control mode to thereby switch on and off the bridge-configured switching elements in accordance with the pattern of the periodic repetitive pulses stored in the ROM.

This makes possible that the voltage utilization factor obtained at the moment when the amplitude of the command voltage for the PWM control mode substantially reaches the half of the inverter input DC voltage is continuously shifted to the voltage utilization factor obtained using the single pulse control mode.

Under the inverter being driven based on the periodic repetitive pulses stored in the ROM, when the request value of the at least one control variable, such as an output torque of the three-phase motor and/or a rotational speed thereof is reduced with reduction in the voltage utilization factor, the norm of the vector of the command voltage is reduced below the preset value. At that time, the method shifts the control mode for the inverter from the single-pulse control mode to the PWM control mode.

However, at the moment when the control mode is shifted from the single-pulse control mode to the PWM control mode, a voltage required for the three-phase motor to create a torque generated immediately before the shift may not be obtained in the PWM control mode. When the voltage required for the three-phase motor to create the torque generated immediately before the shift is not obtained in the PWM control mode, the shift may cause the generated torque by the three-phase motor to be suddenly changed. This may make it difficult to maintain, at a high level, the performance of the current feedback control when the control of the inverter is shifted from the single-pulse control mode to the PWM control mode.

SUMMARY OF THE INVENTION

In view of the background, an object of at least one aspect of the present invention is to provide apparatuses for controlling at least one controlled variable of a rotary machine; these apparatuses are improved to maintain, at a high level, the performance of the control of the rotary machine even if the voltage utilization factor is shifted from its high region to its low region.

According to one aspect of the present invention, there is provided an apparatus for driving a switching member of a power converter so as to generate, from an inputted DC (Direct Current) voltage, a variable output voltage of the power converter. The output voltage is applied to a rotary machine and adjusting a controlled variable of the rotary machine. The apparatus includes a first drive unit configured to drive, in a first range of a voltage utilization factor, the switching member of the power converter to thereby control the output voltage of the power converter to be matched with a command voltage. The voltage utilization factor is defined based on a ratio of the output voltage to the inputted DC voltage. The apparatus includes a second drive unit configured to drive, in a second range of the voltage utilization factor, the switching member to thereby generate a value of the controlled variable of the rotary machine. The second range of the voltage utilization factor is higher than the first range thereof. The apparatus includes an estimating unit configured to estimate, during the switching member being driven by the second drive unit, a value of a parameter associated with the output voltage of the power converter. The estimated value of the parameter is required for the first drive unit to generate the value of the controlled variable generated by the second drive unit.

BRIEF DESCRIPTION OF THE DRAWINGS

Other objects and aspects of the invention will become apparent from the following description of embodiments with reference to the accompanying drawings in which:

FIG. 8 is a view schematically illustrating, in graph format, a transition, in a d-q coordinate system, of an actual voltage vector and a voltage vector required to generate, based on a vector control, a torque actually generated by the motor-generator based on a field weakening control according to the first embodiment;

DETAILED DESCRIPTION OF EMBODIMENTS OF THE INVENTION

Embodiments of the present invention will be described hereinafter with reference to the accompanying drawings. In each of the embodiments, the present invention is, for example, applied to a control system for a three-phase motor-generator installed in a hybrid vehicle; this three-phase motor-generator is an example of various types of multiphase rotary machines.

First Embodiment

Figure 1:
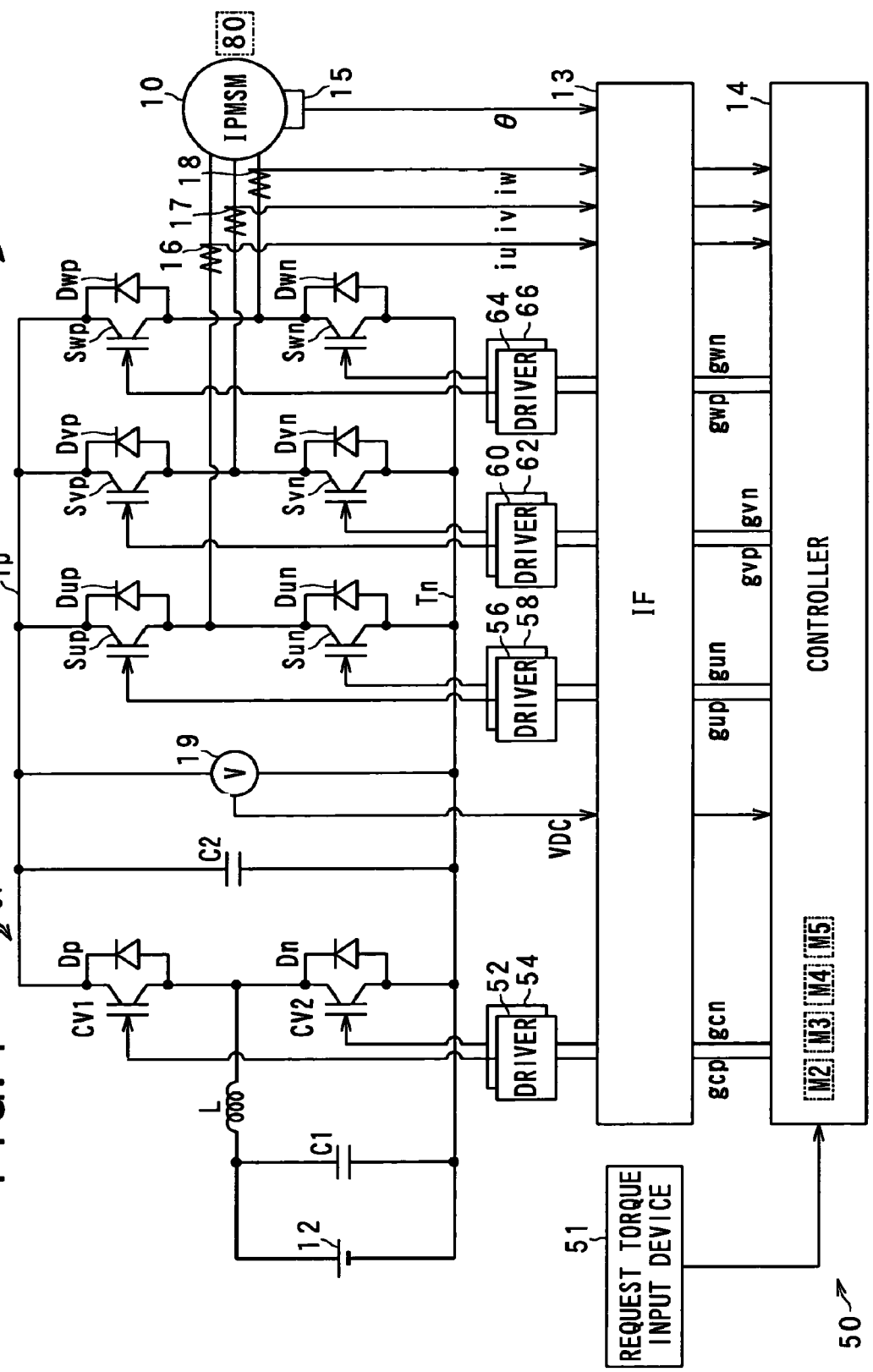
FIG. 1 is a circuit diagram of a control system according to the first embodiment of the present invention.

Referring to the drawings, in which like reference characters refer to like parts in several figures, particularly to FIG. 1, there is illustrated a three-phase motor-generator, referred to simply as "motor-generator (MG)" 10 installed in a hybrid vehicle. In the first embodiment, as the motor-generator 10, a salient-pole motor having a salient-pole structure is used. For example, as the motor-generator 10, an IPMSM (Interior Permanent Magnet Synchronous Motor) is used.

In FIG. 1, there is also illustrated a control system 50. The control system 50 is equipped with an inverter IV serving as a power converter, a voltage converter CV, a high-voltage battery 12, an interface 13, a control apparatus 14, and gate drivers 52, 54, 56, 58, 60, 62, 64, and 66.

Specifically, the motor-generator 10 and the high-voltage battery 12 can establish electrical connection therebetween via the inverter IV and the voltage converter CV.

For example, the motor-generator 10 is provided with an annular rotor having an iron rotor core. The iron rotor core is, for example, directly or indirectly coupled to a crankshaft of an engine installed in the hybrid vehicle.

The rotor has a salient-pole structure.

Specifically, the rotor core of the rotor is provided at its circumferential portions with at lest one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-c coordinate system (two-phase rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings) wound in the slots of the stator.

The three-phase windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration to constitute a neutral point.

The motor-generator 10 is operative to receive at its three-phase windings three-phase currents to thereby generate a rotating magnetic flux; this allows the rotor to turn based on magnetic attractive force between the rotating magnetic flux and a magnetic flux of the rotor.

The voltage converter CV includes a coil L, a capacitor C1, a capacitor C2, a pair of series-connected switching elements CV1 and CV2, and a pair of flywheel diodes Dp and Dn.

One electrode of the capacitor C1 is connected to a positive terminal of the high-voltage battery 12, and the other thereof to a negative terminal of the high-voltage battery 12. One end of the coil L is connected to both the positive terminal of the high-voltage battery 12 and the one electrode of the capacitor C1.

In the first embodiment, as the switching elements CV1 and CV2, IGBTs (Insulated Gate Bipolar Transistors) are respectively used. The flywheel diodes Dp and Dn are connected in antiparallel to the switching elements CV1 and CV2, respectively. The other end of the coil L is connected to a point at which the switching elements CV1 and CV2 are electrically connected in series.

When power MOSFETs are used as the pair of switching elements CV1 and CV2, intrinsic diodes of the power MOSFETs can be used as the flywheel diodes, thus eliminating the flywheel diodes.

The capacitor C2 is connected in parallel to the pair of high- and low-side switching elements CV1 and CV2.

The high-voltage battery 12 is designed as a rechargeable battery and has a nominal voltage of, for example, 288 V.

For example, when the control system 50 operates in a power-running control mode, the switching elements CV1 and CV2 of the voltage converter CV are driven on and off. This converts a voltage across the battery 12 into a higher voltage using electromagnetic energy stored in the coil L by the on and off switchings of the switching elements CV1 and CV2. For example, when a voltage across the battery 12, referred to as "battery voltage", is 288 V, the voltage converter CV works to convert the battery voltage of 288 V into a given voltage higher than the battery voltage of 288 V; the upper limit of the converted voltage is set to, for example, 666 V.

In addition, when the control system 50 operates in a regenerative control mode during the hybrid vehicle being decelerated, the motor-generator 10 serves as a generator to thereby convert mechanical power based on the rotation of the motor-generator 10 into electrical power. The electrical power is converted by the inverter IV into DC power. The switching elements CV1 and CV2 of the voltage converter CV are driven on and off. This converts a voltage across the capacitor C2 based on the converted DC power into a lower voltage based on voltage drop across the coil L by the on and off switchings of the switching elements CV1 and CV2. The lower voltage stepped down from the voltage across the capacitor C2 is charged in the battery 12.

The inverter IV is designed as a three-phase inverter. The inverter IV is provided with a first pair of series-connected high- and low-side switching elements Sup and Sun, a second pair of series-connected high- and low-side switching elements Svp and Svn, and a third pair of series-connected high- and low-side switching elements Swp and Swn. The inverter IV is also provided with flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The first to third pairs of switching elements are parallely connected to each other in bridge configuration.

A connecting point through which the switching elements Sup and Sun of the first pair are connected to each other in series is connected to an output lead extending from the other end of the U-phase winding. Similarly, a connecting point through which the switching elements Svp and Svn of the second pair are connected to each other in series is connected to an output lead extending from the other end of the V-phase winding. Moreover, a connecting point through which the switching elements Sup and Swn of the third pair are connected to each other in series is connected to an output lead extending from the other end of the W-phase winding.

One end of the series-connected switching elements of each of the first, second, and third pairs, such as the drain of the corresponding high-side switching element, is connected to the positive terminal of the battery 12 via a positive input terminal Tp of the inverter IV, the switching element CV1 and the coil L. The other end of the series-connected switching elements of each of the first, second, and third pairs, such as the source of the corresponding low-side switching element, is connected to the negative terminal of the battery 12 via a negative input terminal Tn of he inverter IV.

The control system 50 is equipped with, as means for detecting operating conditions of each of the motor-generator 10 and the inverter IV, a rotational angle sensor 15, current sensors 16, 17, and 18, and a voltage sensor 19.

The rotational angle sensor 15 is arranged, for example, close to the rotor of the motor-generator 10 and operative to measure an actual rotational angle (electric angle) θ of the d-axis of the rotor with respect to a stator coordinate system fixed in space which characterizes the three-phase windings of the stator. The rotational angle sensor 15 is also operative to measure an actual electric angular velocity (rotational velocity) ω of the d-axis of the rotor. The electric angular velocity ω will be referred to as "rotational velocity ω" hereinafter. The rotational angle sensor 15 is communicable with the controller 14 via the interface 13 and operative to send, to the controller 14, the measured actual rotation angle θ and rotational velocity ω of the rotor as some of motor-generator state variables.

The current sensor 16 is arranged to allow measurement of an instantaneous U-phase alternating current actually flowing through the U-phase winding of the stator. Similarly, the current sensor 17 is arranged to allow measurement of an instantaneous V-phase alternating current actually flowing through the V-phase winding of the stator. The current sensor 18 is arranged to allow measurement of an instantaneous W-phase alternating current actually flowing through the W-phase winding of the stator.

The current sensors 16, 17, and 18 are communicable with the controller 14 through the interface 13.

Specifically, each of the current sensors 16, 17, and 18 is operative to send, to the controller 14, the instantaneous value of a corresponding one of the U-, V-, and W-phase alternating currents as some of the motor-generator state variables.

The voltage sensor 19 is arranged to allow measurement of an input voltage VDC to be applied to the inverter IV. The input voltage VDC corresponds to a voltage of the battery 12. The voltage sensor 19 is communicable with the controller 14 through the interface 13, and operative to send, to the controller 14, the inverter input voltage VDC to be applied to the inverter IV as one of the motor-generator state variables.

The controller 14 is designed as, for example, a computer circuit consisting essentially of, for example, a CPU, an I/O interface, and a memory unit, and operates on a voltage lower than the battery voltage. Thus, the controller 14 constitutes a low voltage system, and the motor-generator 10, the inverter IV, the converter CV, and the high-voltage battery 12 constitute a high voltage system.

The interface 13 is provided with photo couplers as examples of insulators. The interface 13 is configured to establish electrical insulation between the low voltage system (the controller 14) and the high voltage system, and to allow communications therebetween.

The controller 14 is communicable with a request torque input device 51 installed in the hybrid vehicle. The request torque input device 51 is operative to input, to the controller 14, a commanded torque (request torque) of a user, such as an acceleration command of the user.

For example, an accelerator position sensor installed in the hybrid vehicle can be used as the request torque input device 51. Specifically, the accelerator position sensor is operative to sense an actual position of an accelerator pedal of the hybrid vehicle operable by the driver and to send, as data representing a request torque of the driver, the sensed actual position of the accelerator pedal to the controller 14. The data representing a variable request torque will be referred to as "request torque data" hereinafter.

The switching elements CV1, CV2, Sup, Sun, Svp, Svn, Swp, and Swn have control terminals, such as the gates, connected to the gate drivers 52, 54, 56, 58, 60, 62, 64, and 66, respectively.

The gate drivers 52, 54, 56, 58, 60, 62, 64, and 66 are communicable with the controller 14 via the interface 13.

The controller 14 is operative to generate:
a drive signal gcp for driving the switching element CV1;
a drive signal gcn for driving the switching element CV2;
a drive signal gup for driving the switching element Sup;
a drive signal gun for driving the switching element Sun;
a drive signal gup for driving the switching element Svp;
a drive signal gun for driving the switching element Svn;
a drive signal gwp for driving the switching element Swp; and
a drive signal gwn for driving the switching element Swn.

Each of the drive signals gcp, gcn, gup, gun, gup, gun, gwp, and gwn is a pulse signal with a controllable duty cycle (controllable pulse width, or controllable on duration)

Specifically, the controller 14 is operative to cause each of the gate drivers 52, 54, 56, 58, 60, 62, 64, and 66 to apply a corresponding one of the drive signals gcp, gcn, gup, gun, gup, gvn, gwp, and gwn to a corresponding one of the switching elements Scp, Scn, Sup, Sun, Sup, Sun, Swu, and Swn. This allows a corresponding one of the switching elements Scp, Scn, Sup, Sun, Sup, Sun, Swu, and Swn to be driven on during the pulse width (on-duration) of a corresponding one of the drive signals gcp, gcn, gup, gun, gup, gun, gwp, and gwn.

Figure 2:
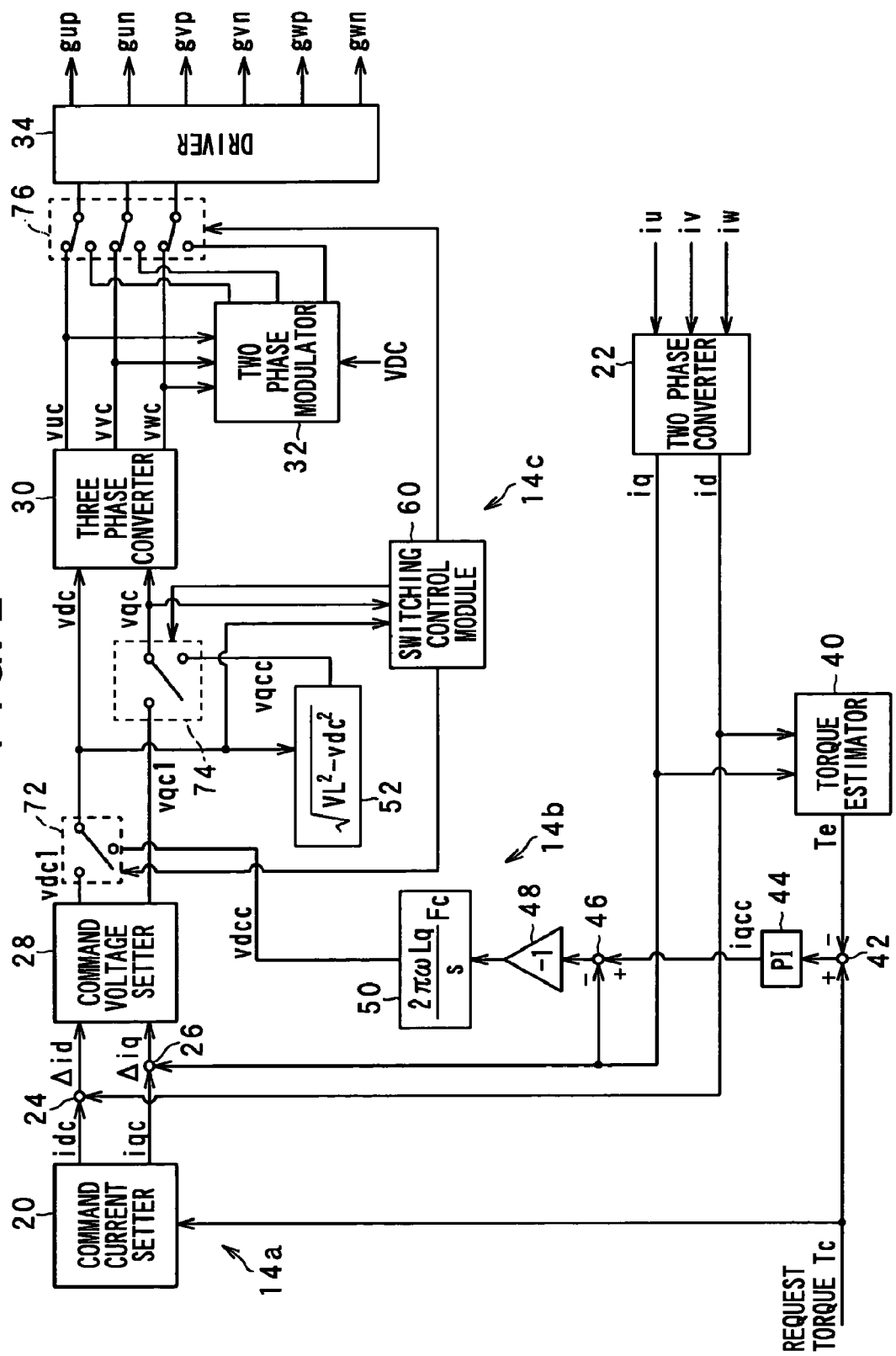
FIG. 2 is a block diagram schematically illustrating functional modules of a controller equivalent to tasks to be executed thereby according to the first embodiment.

FIG. 2 schematically illustrates functional modules of the controller 14 equivalent to tasks to be executed by the controller 14.

As illustrated in FIG. 2, the controller 14 includes a vector control unit 14a, a field weakening unit 14b, and a switching control unit 14c, these units 14a, 14b, and 14c are operatively associated with one another. The vector control unit 14a is operative to carry out vector control of the inverter IV, the field weakening unit 14b is operative to carry out field weakening control of the inverter IV, and the switching control unit 14c is operative to carry out switching between the vector control and the field weakening control.

Next, functional modules included in the vector control unit 14a, functional modules included in the field weakening control unit 14b, and functional modules included in the switching control unit 14c will be described hereinafter in this order.

Note that each of or some of the functional modules included in the controller 14 can be designed as a hardwired logic circuit, programmed logic circuit, or hardwired-logic and programmed-logic hybrid circuit.

Vector Control Unit

The vector control unit 14a includes a command current setter 20, a two-phase converter 22, a deviation calculator 24, a deviation calculator 26, a command voltage setter 28, a three-phase converter 30, a two-phase modulator 32, and a drive signal generator 34.

The cooperative operations of the modules 20, 22, 24, 26, 28, 30, 32, and 34 carry out a vector control task described hereinafter.

The two-phase converter 22 works to receive actual instantaneous U-, V-, and W-phase alternating currents iu, iv, and iw measured by the respective current sensors 16, 17, and 18 and the actual rotation angle θ measured by the rotational angular sensor 15.

The two-phase converter 22 also works to convert the received actual instantaneous U-, V-, and W-phase alternating currents iu, iv, and iw in the stator coordinate system into actual d-axis and q-axis current components id and iq in the d-q coordinate system of the rotor based on the received actual rotational angle θ.

The command current setter 20 works to receive the request torque data inputted from the request torque input device 51. For example, the command current setter 20 works to set a first d-axis command current component idc and a first q-axis command current component iqc in the d-q coordinate system of the rotor based on the request torque Tc of the request torque data. The first d-axis command current component idc and the first q-axis command current component iqc correspond to request three-phase currents in the d-q coordinate system; these request currents are required to generate the request torque Tc.

For example, the command current setter 20 stores therein a map M1 composed of, for example, a data table or a program. The map M1 represents a function (relationship) between a variable of the request torque Tc and a variable of each of the command current components idc and iqc. Based on the map M1, the command current setter 20 sets the command current components idc and iqc corresponding to the input values of the request torque Tc.

The deviation calculator 24 works to calculate a deviation Δ id between the first d-axis command current component idc and the actual d-axis current component id. The deviation calculator 26 works to calculate a deviation Δ iq between the first q-axis command current component iqc and the actual q-axis current component iq.

The command voltage setter 28 works to set, based on the deviation Δ id, a first command voltage vdc1 in the d-axis; this first command voltage vdc1 allows the first d-axis command current component idc to be matched with the measured actual d-axis current component id.

The command voltage setter 28 works to set, based on the deviation Δ iq, a first command voltage vqc1 in the q-axis; this first command voltage vqc1 allows the first q-axis command current component iqc to be matched with the measured actual q-axis current component iq.

Specifically, in the first embodiment, the command voltage setter 28 computes the first command voltages vdc1 and vqc1 using a proportional gain term and an integral gain term of a proportional integral feedback algorithm.

In the proportional integral feedback algorithm, each of the first command voltages vdc1 and vqc1 is expressed based on the proportional gain term and integral gain term.

The proportional gain term for each of the first command voltages vdc1 and vqc1 contributes to change in a corresponding one of the first command voltages vdc1 and vqc1 in proportion to a corresponding one of the temporal deviations Δ id and Δ iq. The integral gain term is proportional to an accumulated offset of instantaneous values of each of the temporal deviations Δ id and Δ iq over time to reset the accumulated offset (steady-state deviation) over time to zero.

The first command voltage vdc1 is selected as a command voltage vdc in the d-axis when the vector control based on the vector control unit 14a is selected by the switching control unit 14c. Similarly, the first command voltage vqc1 is selected as a command voltage vqc in the q-axis when the vector control based on the vector control unit 14a is selected by the switching control unit 14c.

The three-phase converter 30 works to convert, based on the actual rotational angle θ, the command voltages vdc and vqc in the d-q axes into a U-phase command voltage uric, a V-phase command voltage vvc, and a W-phase command voltage vwc for the respective U-, V-, and W-phase windings of the motor-generator 10. The U-, V-, and W-phase command voltages vuc, vvc, and vwc correspond to, for example, substantially sinusoidal waves, respectively.

The two-phase modulator 32 works to carry out two-phase modulation of the three-phase command voltages vuc, vvc, and vwc by offsetting the maximum one of the three-phase command voltages vuc, vvc, and vwc with their relative magnitude correlations being maintained to thereby generate modulated command voltages vuc', vvc', and vwc'. The two-phase modulation matches the maximum one of the modulated command voltages uuc', vvc', and vwc' with any one of a potential at the positive input terminal Tp of the inverter IV and that at the negative input terminal Tn thereof.

For example, the two-phase modulator 32 works to:
divide, by the half (½) level of the battery voltage VDC, the command voltages vuc, vvc, and vwc to thereby generate normalized U-, V-, and W-phase duty signals du, du, and dw, respectively; and
two-phase modulate the received normalized duty signals du, du, and dw so as to match one of the duty signals du, de, and dw that is the lowest in level therein with the potential of the negative input terminal Tn of the inverter IV while holding the difference in voltage among the duty signals du, dv, and dw to thereby generate the modulated command voltages vuc, vvc', and vwc'.

Any one of a first group of the three-phase command voltages vuc, vvc, and vwc and a second group of the modulated command voltages vuc', vvc', and vwc' is selected by the switching control unit 14c.

The drive signal generator 34 works to generate, based on: the first group of the three-phase command voltages vuc, vvc, and vwc or the second group of the modulated command voltages vuc', vvc', and vwc', and a triangular (or saw-tooth) carrier wave, drive signals gup, gun, gup, gun, gwp, and gwn. Each of the drive signals gup, gun, gup, gun, gwp, and gwn is a pulse signal with a controllable duty cycle (controllable pulse width).

Specifically, the drive signal generator 34 works to:

compare, in magnitude, the first group of the three-phase command voltages vuc, vuc, and vwc or the second group of the modulated command voltages vuc', vvc', and vwc' with the triangular carrier wave to thereby generate the drive signals gup, gum, gap, gun, gwp, and gwn.

Field Weakening Control Unit

The field weakening control unit 14b includes a torque estimator 40, a deviation calculator 42, a feedback control module 44, a deviation calculator 46, a multiplier 48, a d-axis command voltage setter 50, and a q-axis command voltage setter 52. The cooperative operations of the modules 40, 42, 44, 46, 48, 50, and 52 carry out a filed weakening control task described hereinafter.

The field weakening control unit 14b includes the two-phase modulator 32, and the drive signal generator 34, these modules are shared by the vector control unit 14a.

The torque estimator 40 works to calculate an estimated torque Te to be created by the motor-generator 10 based on the d-axis and q-axis current components id and iq passed from the two-phase converter 22.

For example, the torque estimator 40 works to calculate the estimated torque Te using the number p of pole pair of the rotor, a torque constant Tk, and the following equation [c0]:

$$Te = p \cdot \{(Lq-Ld) \cdot id \cdot iq + Tk \cdot iq\} \quad [c0]$$

The deviation calculator 42 works to calculate a deviation Δ of the request torque Tc from the estimated torque Te.

The feedback control module 44 works to set, based on the deviation Δ passed from the deviation calculator 42, a second q-axis command current component iqcc in the q axis as a manipulated variable of feedback control to adjust the estimated torque Te to the request torque Tc.

Specifically, in the first embodiment, the feedback control module 44 computes the second q-axis command current component iqcc using a proportional gain term and an integral gain term of a proportional integral feedback algorithm.

In the proportional integral feedback algorithm, the second q-axis command current component iqcc is expressed based on the proportional gain term and integral gain term.

The proportional gain term contributes to change in the second q-axis command current component iqc in proportion to the deviation Δ. The integral gain term is proportional to an accumulated offset of instantaneous values of the deviation Δ over time to reset the accumulated offset (steady-state deviation) over time to zero.

The deviation calculator 46 works to calculate a deviation Δ iqcc of the second q-axis command current component iqcc from the actual command current iq.

The multiplier 48 serves as the negative sign of the term ωLqiq in the voltage equation described hereinafter, and works to reverse the sign of the deviation Δ iqcc by multiplying the deviation Δ iqcc by "−1", and thereafter, output the deviation Δ iqcc with the reversed sign.

The d-axis command voltage setter 50 works to set, based on the output of the multiplier 48, a second command voltage vdcc in the d-axis as a manipulated variable of feedback control to adjust the actual q-axis current component iq to the second q-axis command current component iqcc.

Specifically, in the first embodiment, the d-axis command voltage setter 50 computes the second command voltage vdcc using a proportional gain term and an integral gain term of a proportional integral feedback algorithm.

In the proportional integral feedback algorithm, the second command voltage vdcc is expressed based on the proportional gain term and integral gain term.

The proportional gain term contributes to change in the second command voltage vdcc in proportion to the output of the multiplier 48. The integral gain term is proportional to an accumulated offset of instantaneous values of the output of the multiplier 48 over time to reset the accumulated offset (steady-state deviation) over time to zero.

The second command voltage vdcc is selected as the command voltage vdc in the d-axis when the field weakening control based on the field weakening control unit 14b is selected by the switching control unit 14c.

The q-axis command voltage setter 52 works to calculate, as a second command voltage vqec in the q-axis, the square root of the subtraction of the square of the second command voltage vdcc from the square of a limit voltage VL; this calculation is represented by "vqcc=$\sqrt{V_L^2 - vdcc^2}$". The limit voltage VL is defined as the product of the battery voltage VDC, 1.15, and the square root of "⅜". The limit voltage VL will be described hereinafter.

The second command voltage vdcc is selected as the command voltage vdc in the d-axis when the field weakening control based on the field weakening control unit 14b is selected by the switching control unit 14c. Similarly, the second command voltage vqcc is selected as the command voltage vqc in the q-axis when the field weakening control based on the field weakening control unit 14b is selected by the switching control unit 14c.

The operations of the three-phase converter 30, the two-phase modulator 32, and the drive signal generator 34 in the field weakening control unit 14b are the same as those in the vector control unit 14a.

Thus, the filed weakening control unit 14b carries out the field weakening control to thereby maintain the output voltage of the inverter IV to the limit voltage VL.

The simple configuration of the field weakening control unit 14b set forth above achieves field weakening control with high controllability. The reason will be described hereinafter.

Figure 3A:
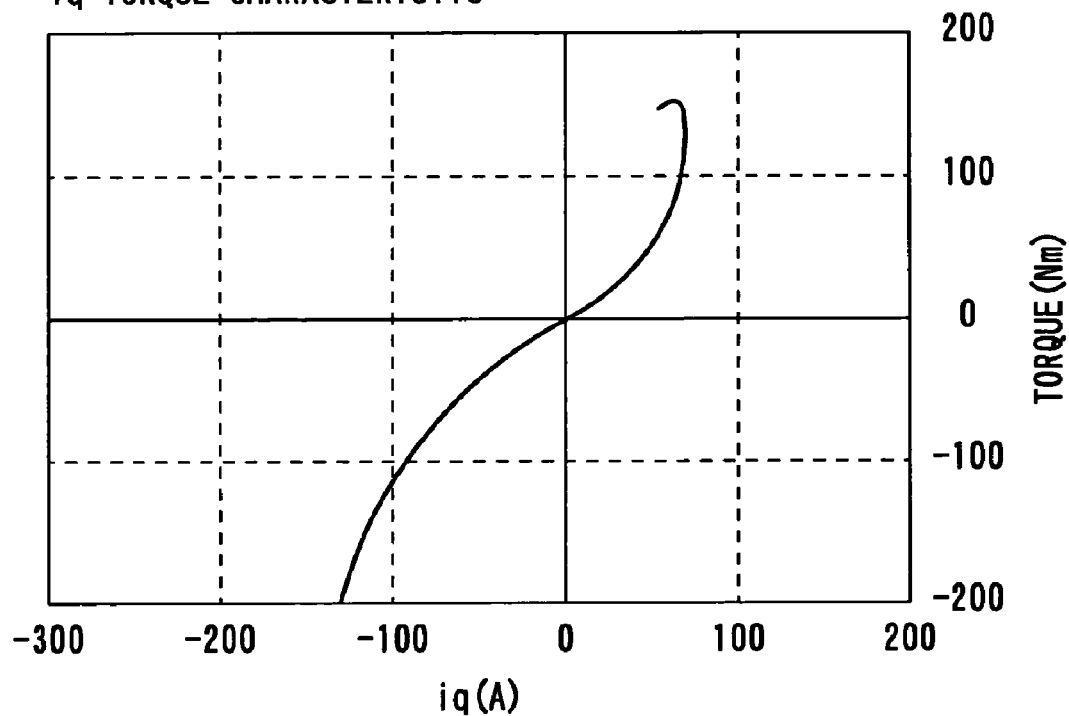
FIG. 3A is a graph schematically illustrating a relationship between a q-axis current component flowing in a motor-generator and a torque created therein in a higher velocity range of the motor-generator according to the first embodiment.

FIG. 3A schematically illustrates, in graph format, a relationship between q-axis current component iq flowing in the motor-generator 10 and torque created therein in a higher velocity range of the motor-generator 10. In the graph, the horizontal axis represents values of the q-axis current component iq in ampere [A], and the vertical axis represents corresponding values of the torque in Newton meter [Nm].

Referring to FIG. 3A, the q-axis current component iq and the torque have a one-to-one correspondence therebetween, and therefore, the more increased the q-axis current component iq is, the more increased the torque is. Determination of a value of the q-axis current component iq uniquely determines a corresponding value of the torque, and the q-axis current versus torque graph illustrated in FIG. 3A has a comparatively high linearity. For this reasons, manipulation of the q-axis current component iq flowing in the motor-generator 10 allows the torque created in the motor-generator to be smoothly controlled.

Figure 3B:
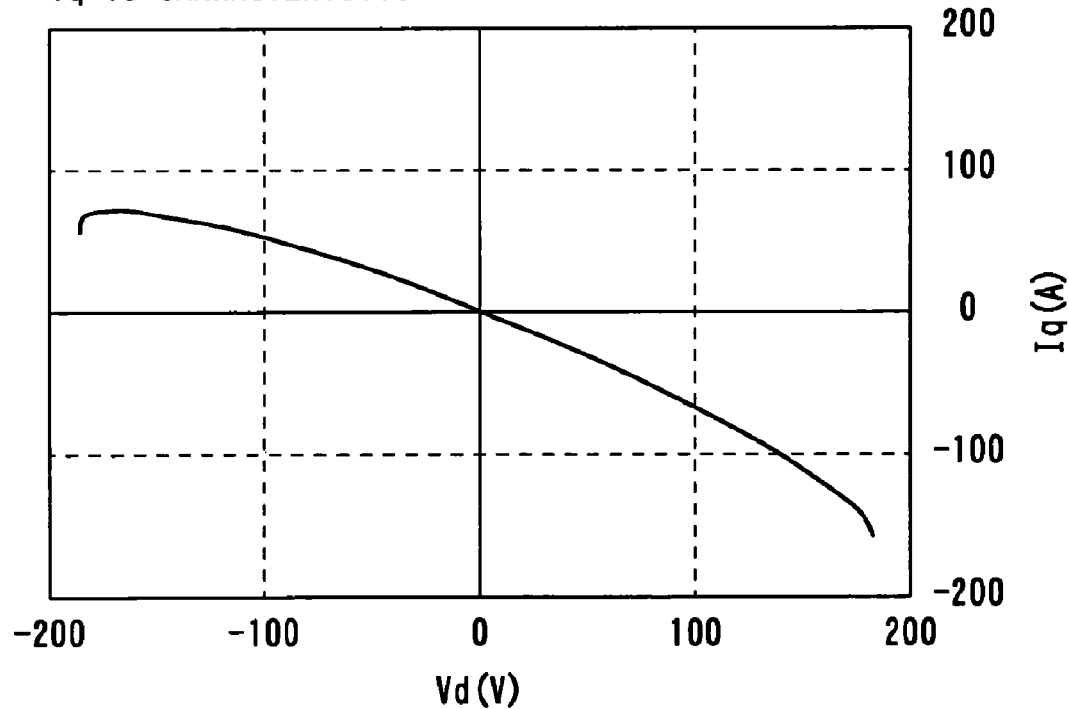
FIG. 3S is a graph schematically illustrating a relationship between a q-axis current component flowing in the motor-generator and a d-axis voltage being applied thereto in a higher velocity range of the motor-generator according to the first embodiment.

In addition, FIG. 3B schematically illustrates, in graph format, a relationship between q-axis current component iq flowing in the motor-generator 10 and d-axis voltage vd being applied thereto in a higher velocity range of the motor-generator 10. In the graph, the vertical axis represents values of the q-axis current component iq in ampere [A], and the horizontal axis represents corresponding values of the d-axis voltage vd in voltage [j].

The d-axis voltage versus q-axis current graph illustrated in FIG. 3B has a comparatively high linearity. The reason why can be described in accordance with the following voltage equation [c1]

$$\begin{bmatrix} vd \\ vq \end{bmatrix} = \begin{bmatrix} R+pLd & -\omega Lq \\ \omega Ld & R+pLq \end{bmatrix} \begin{bmatrix} id \\ iq \end{bmatrix} + \begin{bmatrix} 0 \\ \omega \Phi \end{bmatrix} \qquad [c1]$$

where R represents an armature resistance, and a represents a magnet flux linkage to an armature winding.

In the voltage equation [c1], when the rotational velocity p is high, the terms except for the rotational velocity term in the right side of the equation [c1] can be neglected. For this reason, the d-axis voltage ad can approximate a value of "−ωLq·iq". Thus, the d-axis voltage vd has a linearity with respect to the q-axis current iq.

In the voltage equation [1], when the rotational velocity ω is high, the terms except for the rotational velocity term in the right side of the equation [c1] can be neglected. For this reason, the q-axis voltage vq can also approximate a value of "ωLq·id+ωΦ". Thus, the q-axis voltage vq also has a linearity with respect to the d-axis current component id.

However, the torque to be generated by the motor-generator 10 is not uniquely determined depending on the d-axis current component id, and therefore, different two values of the torque are determined based on the same d-axis current component id.

The reason why is as follows.

Specifically, in a basic vector diagram based on the voltage equation, when the torque to be generated by the motor-generator is positive during power running mode of the hybrid vehicle, a current vector based on a d-axis current component and a q-axis current component is located in the upper left quadrant of the basic vector diagram. This is because the d-axis current component is negative and the q-axis current component is positive.

When the torque to be generated by the motor-generator is negative during regenerative mode of the hybrid vehicle, a current vector based on a d-axis current component and a q-axis current component is located in the lower left quadrant of the basic vector diagram. This is because the d-axis current component is negative and the q-axis current component is negative.

That is, at the same d-axis current component, a positive value and a negative value of the torque are determined based on the same d-axis current component id.

For this reason, in order to improve the controllability of the motor-generator 10 while maintaining a comparatively simple logical structure of the field weakening control, the field weakening control unit 14b is designed to directly control the second q-axis command current component iqcc. This matches the estimated torque Te based on the actual three-phase currents iu, iv, and iw fed back from the motor-generator 10 with the request torque Tc.

How to Design the Command Voltage Setter

Figure 4:
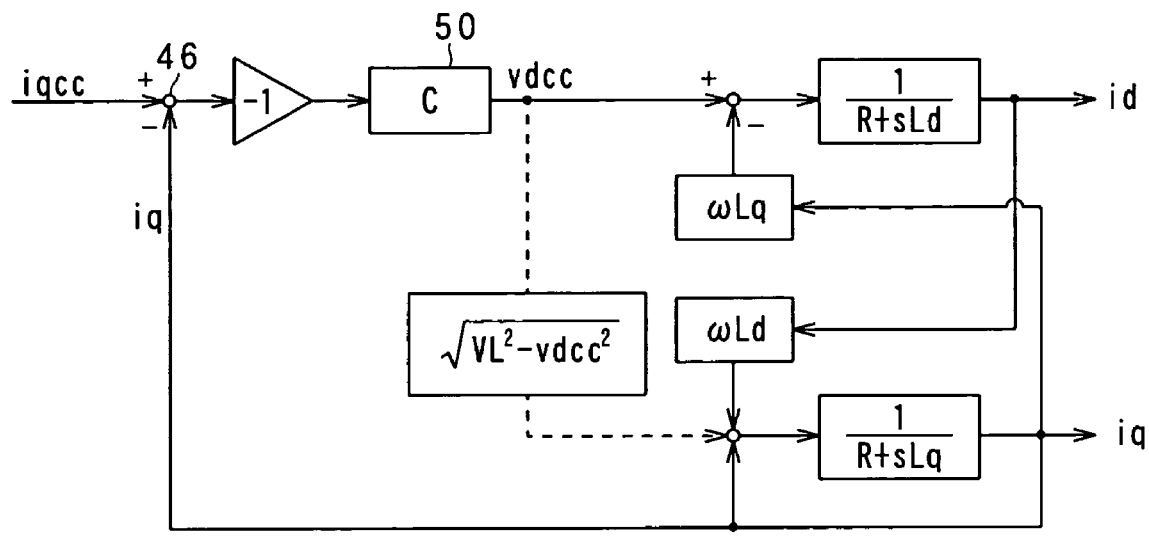
FIG. 4 is a block diagram of a control system according to the first embodiment for controlling an estimated torque based on actual d-axis and q-axis current components in response to an inputted second q-axis command current component in accordance with a voltage equation [c1]

FIG. 4 schematically illustrates a block diagram of a control system according to the first embodiment for controlling the estimated torque Te based on the actual d-axis and q-axis current components id and iq in response to the inputted second q-axis command current component iqcc in accordance with the voltage equation [c1]. In FIG. 4, the command voltage setter 50 is represented as "controller C".

When paths represented by dashed lines in FIG. 4 are neglected in order to formulate an open loop transfer function Cop serving as a transfer function from the input of the multiplier 48 to an output of the actual q-axis current component iq without consideration of the negative sign of the multiplier 48, the following equation [c2] is established:

$$Gop = C \cdot \frac{\frac{\omega Ld}{(R+sLd)(R+sLq)}}{1+\omega^2 LdLq/(R+sLd)(R+sLq)} \qquad [c2]$$

$$= \frac{\omega LdC}{LdLq s^2 + R(Ld+Lq)s + R^2 + \omega^2 LdLq}$$

where s represents Laplace operator.

When the controller 14 is designed to carry out the field weakening control in a higher angular-velocity range of the motor-generator 10, the term of $R^2$ can be neglected because the rotational velocity Dv is high. This allows the equation [c2] to be deformed, resulting in that the following equation [c3] is established:

$$Gop \approx \frac{\frac{C}{\omega Lq}}{\frac{s^2}{\omega^2} + \frac{R(Ld+Lq)s}{\omega^2 LdLq} + 1} \qquad [c3]$$

In the first embodiment, the control system illustrated in FIG. 4 is designed such that an electric angular frequency based on the electric rotational velocity ω is designed to be sufficiently higher than its torque response frequency Fc. The torque response frequency Fc is, for example, defined as a frequency on which the control system illustrated in FIG. 4 is designed.

This causes the rotational velocity n to be sufficiently higher than an angular frequency ωc obtained by the torque response frequency Fc of the torque response of the control system; this establishes the equation "ω·ω>>ωc". For this reason, the open loop transfer function Gop approximates the following equation [c4]:

$$Gop=C/\omega Lq \qquad [c4]$$

Next, a closed loop transfer function Gcl having an input of the second q-axis command current component iqcc and an output of the actual q-axis current component iq is represented by "Gcl=Gop/(1+Gop)" when the paths represented by the dashed lines in FIG. 4 are neglected. The closed loop transfer function Gcl can be freely designed, but, in the first embodiment, in order to simplify the design of the control system, the closed loop transfer function Gcl is designed as a fast-order lag element of "ωc/(s+ωc)". In accordance with the closed loop transfer function Gcl of "ωc/(s+ωc)", the open loop transfer function Gop is represented by "Gop=ωc/s". Using the equation [c4] and the open loop transfer function Gop allows the controller C to be represented by the following equation [c5]:

$$C=\omega cLq\omega/s=2\pi Fc\omega Lq/s \qquad [5]$$

Figure 5:
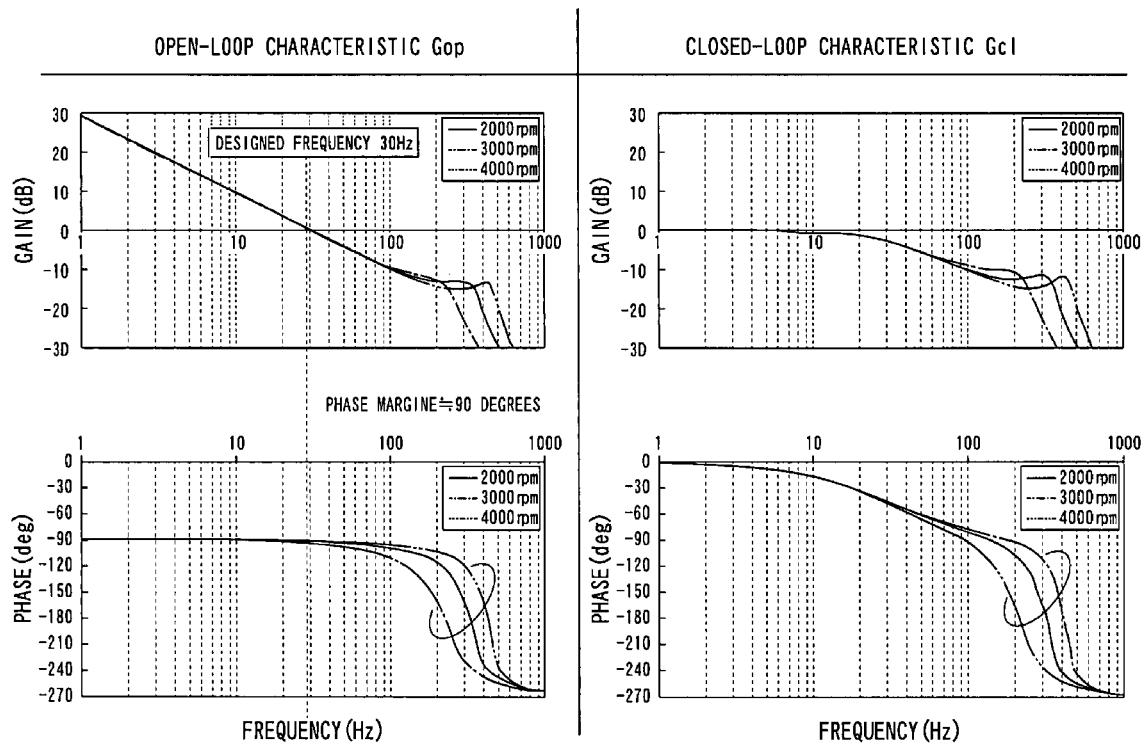
FIG. 5 is a graph schematically illustrating a gain-phase diagram of an open loop transfer function of the control system illustrated in FIG. 4 when a phase margin is substantially set to 90 degrees and that of a closed loop transfer function of the control system according to the first embodiment.

FIG. 5 schematically illustrates, when the torque response frequency Fc is set to 30 Hz, a gain-phase diagram of the open loop transfer function Gop when a phase margin is substantially set to 90 degrees and that of the closed loop transfer

Switching Control Unit

The switching control unit 14c includes a switching control module 70, a first selector 72, a second selector 74, and a third selector 76.

The first and second selectors 72 and 74 are operatively arranged between the command voltage setter 28 and the three-phase converter 30, and the third selector 76 is operatively arranged between the three-phase converter 30 and the drive signal generator 34. Each of the first to third selectors 72, 74, and 76 is controllably connected to the switching control module 60.

The switching control module 70 works to cause the first and second selectors 72 and 74 to select any one of: the pair of the first command voltages vdc1 and vqc1; and the pair of the second command voltages vdcc and vqcc.

In addition, the switching control module 70 works to cause the third selector 76 to:

select the second group of the modulated command voltages vuc', vvc', and vwc' when the vector control unit 14a carries out the vector control of the inverter IV; and select the first group of the three-phase command voltages vuc, vvc, and vwc when the field weakening control unit 14b carries out the field weakening control of the inverter IV.

Figure 6:
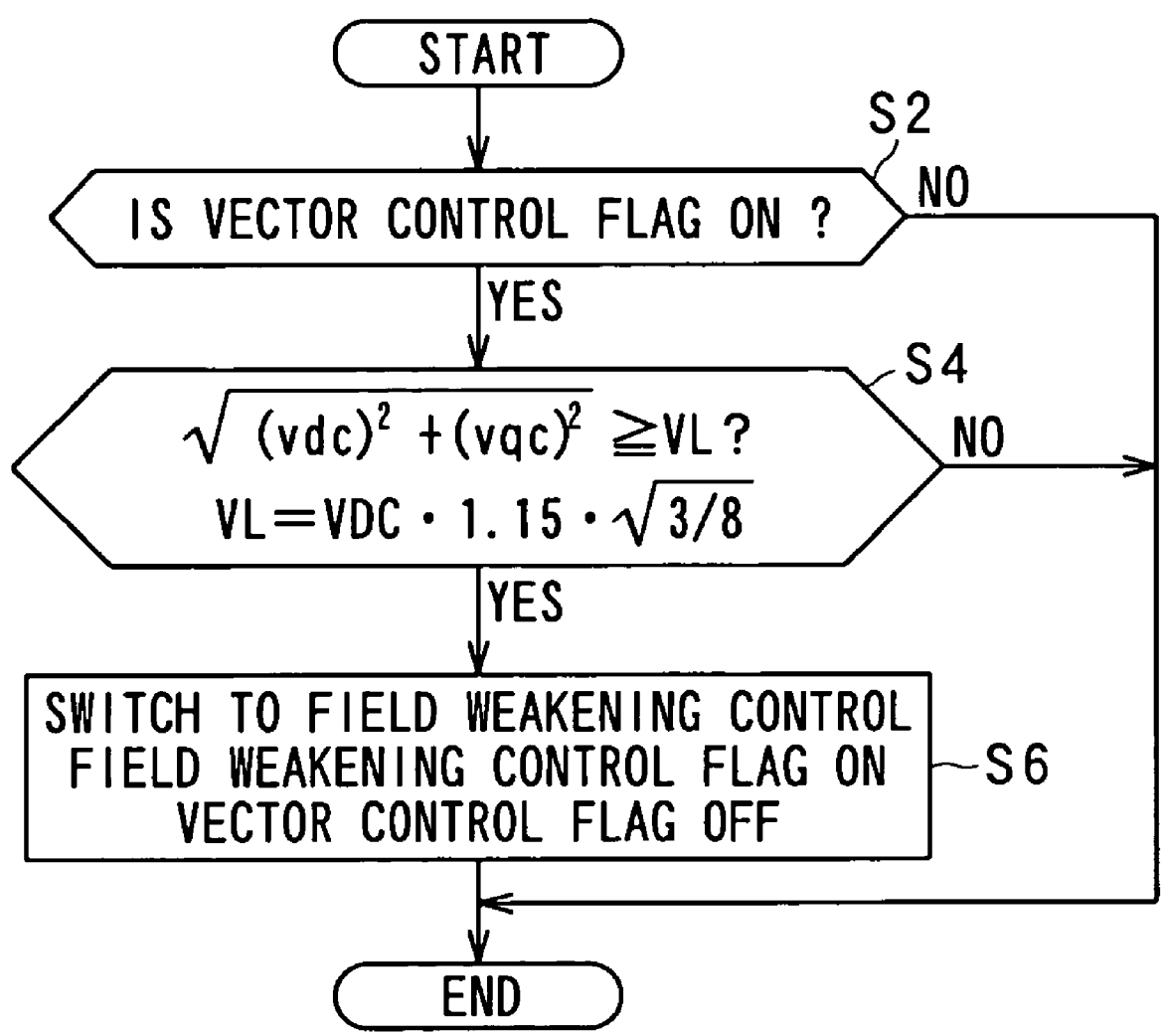
FIG. 6 is a flowchart schematically illustrating a first switching routine to be executed by the controller according to the first embodiment.

A first switching routine from the vector control to the field weakening control to be executed by the controller 14 will be described hereinafter with reference to FIG. 6. The first switching routine is, for example, programmed in the controller 14 to be repeatedly executed thereby at a preset cycle.

Starting the first switching routine, the controller 14 determines whether a vector control mode flag is set to ON in step S2. Note that the vector control flag is for example set by software in the controller 14. The vector control mode flag is set to OFF as default information, and set to ON when the vector control is started. During the vector control mode flag being set to ON, the vector control unit 14a operates in the vector control mode so that:

the pair of the first command voltages vdc1 and vqc1 are selected by the respective first and second selectors 72 and 74, and the second group of the modulated command voltages vuc', vvc', and vwc' is selected by the third selector 76.

Upon determining that the vector control mode flag is set to ON (the determination in step S2 is YES), the controller 14 computes a norm of a vector of the command voltages vdc and vqc in the d-q coordinate system in step S4. The norm of a vector is defined as the root sum square of components of the vector.

In step S4, the controller 14 computes the limit voltage VL that can output the inverter IV as the product of the battery voltage VDC, 1.15, and the square root of "3/8".

The reason why the square root of "3/8" is used is as follows.

Note that a modulation factor is defined as a ratio of an amplitude of each of the three-phase command voltages vuc, Vuc, and vwc to the half of the inverter input voltage VDC.

When the modulation factor is set to 1, the amplitude (peak value) of each of the command voltages Vuc, Vvc, and Vwc is set to "VDC/2". This means an RMS value of each of the command voltages vuc, vvc, and vwc is equal to "(VDC/2)·(1/√2)".

The norm of the vector of the command voltages vdc and vqc corresponding to an RMS value of an output voltage of the inverter IV equivalent to a line-to-line command voltage between adjacent any two phases is the product of √3 and one-phase command voltage; this product is equal to "(VDC/2)·(1/√2)·√3". Thus, the norm of the vector of the command voltages vdc and vqc is represented as "VDC·√3/8" when the modulation factor is set to 1.

Note that the modulation factor of 1 can be converted into a voltage utilization factor of the order of 0.61. The voltage utilization factor represents a ratio of an output voltage of the inverter IV to the input voltage VDC. More specifically, the voltage utilization factor is a ratio of an RMS value of a line-to-line voltage of the motor-generator 10 to the inverter input voltage VDC.

The reason why the value of 1.15 is used is as follows.

As described above, when the peak-to-peak of each of the modulated command voltages vuc', vvc' and vwc' is equal to the inverter input voltage VDC, the modulation factor becomes 1.15. The modulation factor of 1.15 can be converted into the voltage utilization factor of the order of 0.71.

Specifically, the limit voltage X represents an uppermost voltage that the inverter IV can output.

Thus, in step S4, the controller 14 determines whether the norm of the vector of the command voltages vdc and vqc is equal to or greater than the limit voltage VL.

Upon determining that the norm of the vector of the command voltages vdc and vqc is equal to or greater than the limit voltage VL (the determination in step S4 is YES), the controller 14 determines that the controllability of the motor-generator 10 may not be maintained at a high level in the vector control. For example, when the command voltages vdc and vqc required to generate the request torque in a higher velocity range of the motor-generator 10 increases with the voltage utilization factor increasing so that the norm of the command voltages vdc and vqc reaches the limit voltage VL, the controller 14 determines that the controllability of the motor-generator 10 may not be maintained at a high level in the vector control.

Then, in step S6, the controller 14 sets the vector control mode flag to OFF, and sets a field weakening control mode flag to ON. Note that the field weakening control mode flag is for example set by software in the controller 14. The field weakening control mode flag is set to OFF as default information.

In response to the switching of the field weakening control mode flag from OFF to ON, the field weakening control unit 14b operates in the field weakening control mode so that:

the pair of the second command voltages vdc2 and vqc2 are selected by the respective first and second selectors 72 and 74, and the first group of the modulated command voltages vuc, vvc, and vwc is selected by the third selector 66.

Thereafter, the field weakening control is carried out by the field weakening control unit 14b set forth above.

For example, the filed weakening control achieves a value of the voltage utilization factor between a value of the voltage utilization factor, such as 0.71, achieved by the vector control, and a value of the voltage utilization factor, such as 0.78, achieved by the single-pulse control described in the BACKGROUND OF THE INVENTION.

Otherwise, when the negative determination is executed in each of steps S2 and S4, or when the process in step S6 is completed, the first switching routine is exited.

A second switching routine from the field weakening control to the vector control to be executed by the controller 14 will be described hereinafter with reference to FIG. 7. The second switching routine is, for example, programmed in the controller 14 to be repeatedly executed thereby at a preset cycle.

Starting the second switching routine, the controller 14 determines whether the field weakening control mode flag is set to ON in step S10.

Upon determining that the field weakening control mode flag is set to ON (the determination in step S10 is YES), the controller 14 computes the estimated torque Te based on the d-axis and q-axis current components id and iq (see the torque estimator 40 in FIG. 2) in step S12.

Next, the controller 14 estimates a d-axis command current component idce and a q-axis command current component iqce based on the estimated torque Te in step S14.

For example, in step S14, the command current setter 20 sets the estimated d-axis command current component idce and the estimated q-axis command current component iqce in the d-q coordinate system of the rotor based on the estimated torque Te. The estimated d-axis command current component idce and the estimated q-axis command current component iqce correspond to request three-phase currents in the d-q coordinate system; these request currents are required to generate the estimated torque Te.

In step S16, the controller 14 estimates, based on the estimated d-axis and q-axis command current components idce and iqce, a command voltage vdce in the d-axis and a command voltage vqce in the q-axis.

The estimated command voltages vdce and vqce allow the estimated d-axis and q-axis command current components idce and iqce to be achieved by the vector control. For example, the controller 14 assigns the estimated d-axis and q-axis command current components idce and iqce to the voltage equation [c1] as the d-axis and q-axis current components id and iq, and assigns the rotational velocity ω to the voltage equation [c1]. This calculates the target values of the command voltages vdc1 and vqc1.

Next, in step S18, the controller 14 computes a norm of a vector of the estimated command voltages vdce and vqce, and determines whether the norm of the vector of the estimated command voltages vdce and vqce is equal to or lower than a subtraction of a preset value α from the limit voltage VL.

The operation in step S18 is to determine whether three phase command voltages vuce, vvce, and vwce based on the estimated command voltages vdce and vqce correspond to a value of the modulation factor lower than 1.15 of the modulation factor. The three-phase command voltages vuce, vvce, and vwce are required to generate the estimated torque Te by the vector control. The preset value a is a positive integer and set to prevent hunting due to the switching from the vector control to the field weakening control illustrated in FIG. 6 and the switching from the field weakening control to the vector control illustrated in FIG. 7.

Upon determining that the norm of the vector of the estimated command voltages vdce and vqce is equal to or lower than the subtraction of the preset value α from the limit voltage VL (YES in step S18), the controller 14 sets the field weakening control mode flag to OFF, and sets the vector control mode flag to ON.

In response to the switching of the vector control mode flag from OFF to ON, the pair of the first command voltages vdc1 and vqc1 are selected by the respective first and second selectors 72 and 74, and the second group of the modulated command voltages vuc', vvc', and vwc' is selected by the third selector 66. Thereafter, the vector control is carried out by the vector control unit 14a set forth above.

Otherwise, when the negative determination is executed in each of steps S10 and S18, or when the operation in step S20 is completed, the second switching routine is exited.

(a) to (f) of FIG. 1 schematically illustrate the transition of an actual voltage vector Vr and an estimated voltage vector Ve required to generate, based on the vector control, a torque actually generated by the motor-generator 10 based on the field weakening control. In FIG. 8, the actual voltage vector Vr is illustrated by solid lines, the estimated voltage vector Ve is illustrated by chain lines, and the limit voltage VL is illustrated by chain-double dashed lines.

(a) of FIG. 8 represents the actual voltage vector Vr and the estimated voltage vector Ve during the vector control because the norm of each of the actual voltage vector Vr and the estimated voltage vector Ve is lower than the limit voltage VL (see NO in step S4).

(b) of FIG. 8 represents the actual voltage vector Vr and the estimated voltage vector Ve when the command voltages vdc and vqc required to generate the request torque in a higher velocity range of the motor-generator 10 increases with the voltage utilization factor increasing so that the norm of the command voltages vdc and vqc reaches the limit voltage V1. At that time, the norm of each of the actual voltage vector Vr and the estimated voltage vector Ve is located on the limit voltage VL (see YES in step S4 and step S6). That is, (b) of FIG. 8 represents the switching timing from the vector control to the field weakening control.

(c) of FIG. 8 represents the actual voltage vector Vr and the estimated voltage vector Ve during the field weakening control because the norm of the estimated voltage vector Ve is greater than the limit voltage VL (see NO in step S18).

As illustrated in (c) of FIG. 8, in the higher velocity range, the norm of the estimated voltage vector Ve required to generate, based on the vector control, a torque actually generated by the motor-generator 10 based on the field weakening control is over the limit voltage VL.

During the higher velocity range, the field weakening control causes a phase of the actual voltage vector Vr to advance relative to that of the previous actual voltage vector Vr during the vector control while maintaining the norm of the actual voltage vector Vr to the limit voltage VL. The phase advance achieves the torque control in the higher velocity range of the motor-generator 10 even if the norm of the command voltages vdc and vqc is equal to or greater than the limit voltage VL.

(d) of FIG. 8 represents the actual voltage vector Vr and the estimated voltage vector Ve during the field weakening control because the norm of the estimated voltage vector Ve is greater than the limit voltage VL (see NO in step S18).

As illustrated in (d) of FIG. 8, in the higher velocity range, the norm of the estimated voltage vector Ve required to generate, based on the vector control, a torque actually generated by the motor-generator 10 based on the field weakening control is over the limit voltage VL but reduced toward the limit voltage range VL. Thus, the field weakening control causes the phase of the actual voltage vector Vr to delay toward the estimated voltage vector Ve.

(e) of FIG. 8 represents the actual voltage vector Vr and the estimated voltage vector Ve when the command voltages vdc and vqc required to generate the request torque in a lower velocity range of the motor-generator 10 decreases with the voltage utilization factor decreasing so that the norm of the command voltages vdc and vqc is lower than the limit voltage VL by the preset value α. This represents the switching timing from the field weakening control to the vector control (see YES in step S18 and step S20).

(f) of FIG. 8 represents the actual voltage vector Vr and the a estimated voltage vector Ve during the vector control because the norm of each of the actual voltage vector Vr and the estimated voltage vector Ve is lower than the limit voltage VL (see NO in step S4).

As described above, the control system 50 according to the first embodiment is configured to estimate the command voltages vdce and vqce required to achieve, based on the vector control, a torque generated by the motor-generator 10 based on the field weakening control (torque feedback control).

As the first advantage, the command voltages vdce and vqce allow the control system 50 to determine whether a present operating state of the motor-generator 10 reduces torque changes if the field weakening control with a high voltage utilization factor is switched to the vector control with a low voltage utilization factor.

Specifically, when the norm of the estimated command voltages vdce and vqce is equal to or lower than the subtraction of the preset value a from the limit voltage VL, the control system 50 determines that the present state of the motor-generator 10 reduces torque changes if the field weakening control with a high voltage utilization factor is switched to the vector control with a low voltage utilization factor. Thus, it is possible to switch the field weakening control to the vector control while reducing torque changes. This achieves the second advantage of quantifying the criterion of the determination.

The limit voltage VL represents the uppermost voltage that the inverter IV can output. Thus, the field weakening control is shifted to the vector control only when the norm of the estimated command voltages vdce and vqce is equal to or lower than the subtraction of the preset value a from the limit voltage VL.

This achieves the third advantage of maintaining, at a high level the controllability of the vector control during the switching from the field weakening control to the vector control. This prevents the torque generated by the motor-generator 10 from being suddenly changed during the switching from the field weakening control to the vector control.

In addition, the condition to switch the vector control to the field weakening control and the condition to switch the field weakening control to the vector control are set to be different from each other to thereby provide a hysteresis therebetween. This prevents hunting due to the repeated switchings between the vector control and the field weakening control.

As the fourth advantage, the control system 50 according to the first embodiment can estimate, with high accuracy, the command voltages vdce and vqce in the d-q coordinate system based on the estimated torque Te and the rotational velocity ω.

As the fifth advantage, the control system 50 according to the first embodiment can estimate, with high accuracy, the command voltage vdce n the d-axis and the command voltage vqce based on the d-axis and q-axis command current components idee and iqce in accordance with the voltage equation [c1].

In order to generate, based on the vector control, the torque generated based on the field weakening control, the control system 50 is configured to estimate the command voltages vdce and vqce in the d-q coordinate system in place of three-phase voltages required to generate the torque as equivalent values of the three-phase voltages. This achieves the sixth advantage of eliminating the amplitude of each of the three-phase voltages, thus simplifying the switching operations from the field weakening control to the vector control.

The control system 50 according to the first embodiment is configured to switch the vector control to the field weakening control when the norm of the vector of the command voltages vdc and vqc based on the vector control reaches the limit voltage VL. This achieves the seventh advantage of switching the vector control to the field weakening control before the controllability of the motor-generator 10 based on the vector control is reduced.

Second Embodiment

A control system according to the second embodiment of the present invention will be described hereinafter with reference to FIGS. 9 and 10.

The structure of the control system according to the second embodiment is substantially identical to that of the control system 50 according to the first embodiment except for the following different points. So, like parts between the control systems according to the first and second embodiments, to which like reference characters are assigned, are omitted or simplified in description.

The control system 50 according to the first embodiment is designed to estimate the command voltages vdce and vqce in accordance with a model defined by the voltage equation [c1] in order to generate, by the vector control, a torque generated by the field weakening control. However, the model is changed with change in the operating state of the motor-generator 10. For example, the inductances Ld and the Lq are changed with change in a magnetic field generated by currents flowing in the motor-generator 10. The armature resistance R is also changed with change in the temperature of the motor-generator 10.

For this reason, when the command voltages vdce and vqce are estimated with the inductances Ld and the Lq and the armature resistance R being constant, the accuracy of the command-voltage estimations may be changed depending on the change in at least one of the inductances Ld and the Lq and the armature resistance R.

Thus, in order to solve such a problem set forth above, the control system according to the second embodiment is configured to reduce the deviation of the switching timing from the field weakening control to the vector control from an optimum switching timing based on the estimated command voltages vdce and vqce. The deviation will be referred to as "estimated deviation" hereinafter.

Figure 9A:
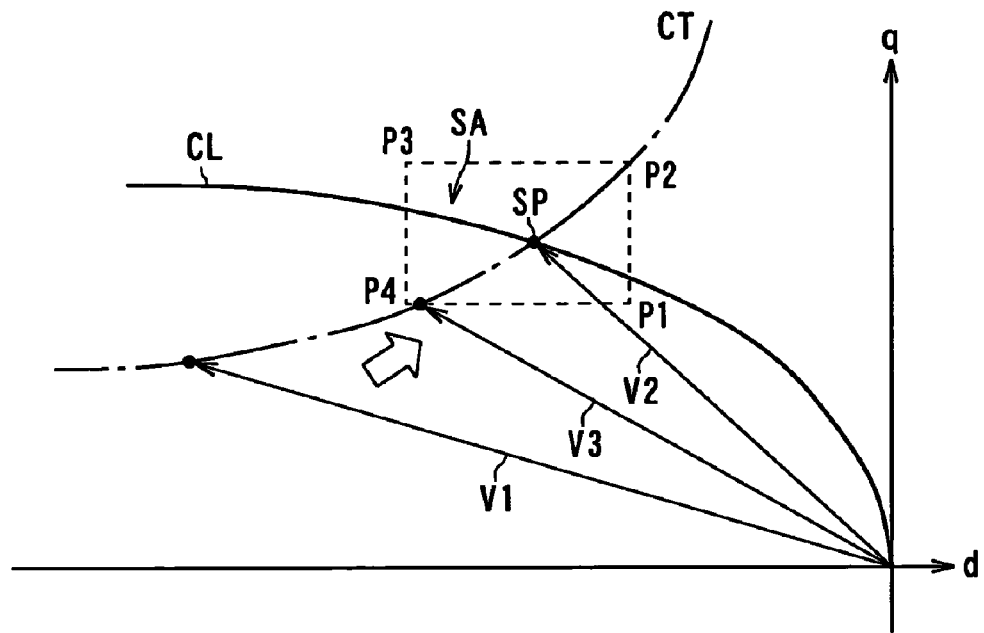
FIG. 9A is a graph schematically illustrating a transition of a current vector and a switching area in the d-q coordinate system according to the second embodiment of the present invention.
Figure 10:
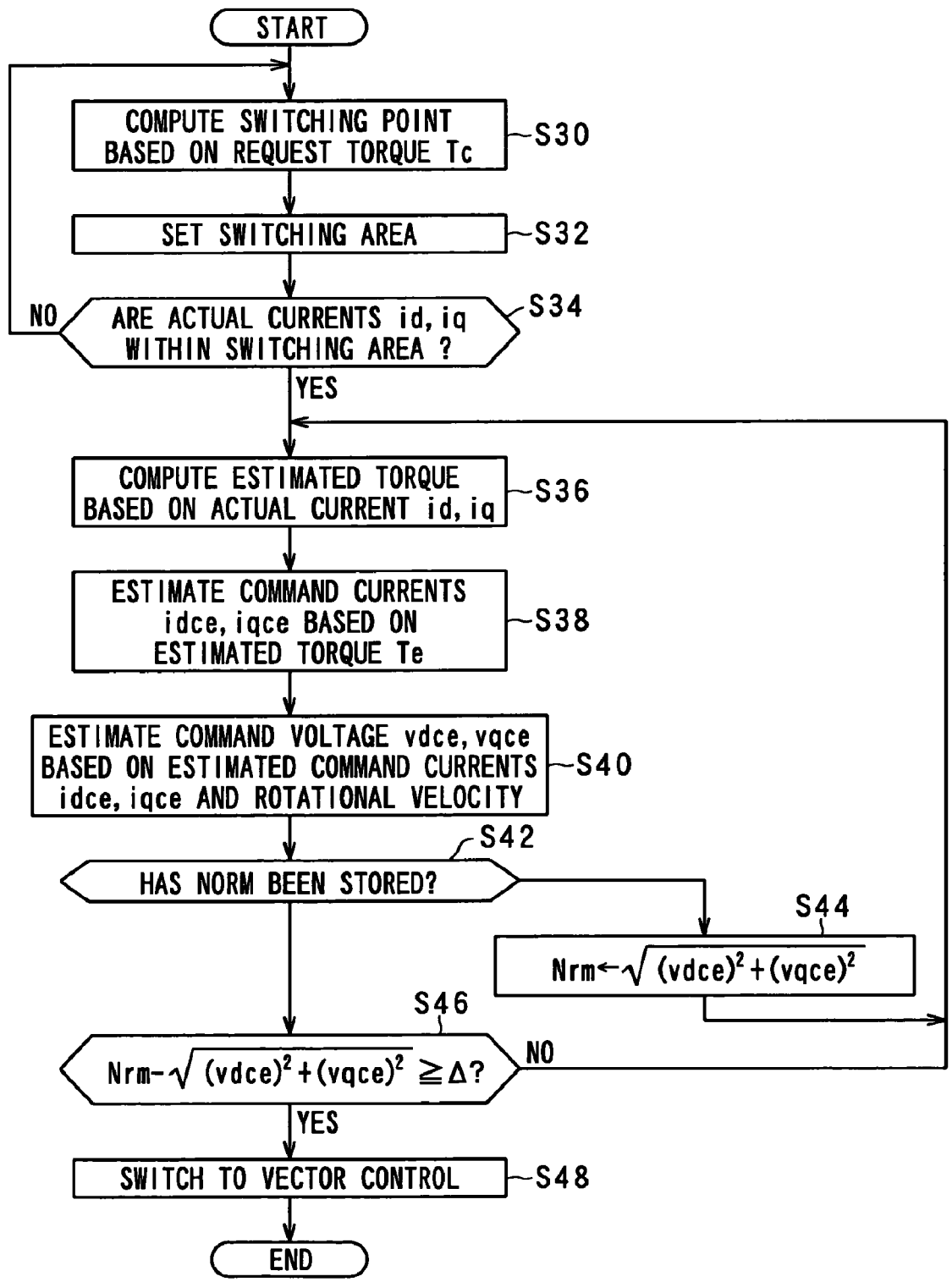
FIG. 10 is a flowchart schematically illustrating a third switching routine to be executed by the controller according to the second embodiment.

In FIG. 9A, a curve CL specified by a solid line in the d-q coordinate system represents a transition of a command current vector to be set by the command current setter 20. A vector V1 in the d-q coordinate system represents a current vector flowing in the motor-generator 10 based on the field weakening control. A curve CT specified by a chain line in the d-q coordinate system represents a constant torque curve. An area including and surrounding a point SP of intersection of the constant torque curve CT and the command-current curve CL in the d-q coordinate system is defined as a switching area SA. When the current vector V1 based on the field weakening control is shifted to a current vector V3 so that the head of the current vector V3 falls within the switching area SA, first values of the command voltages vdce and vqce estimated in accordance with the voltage equation [c1] are stored in the controller 14.

Figure 9B:
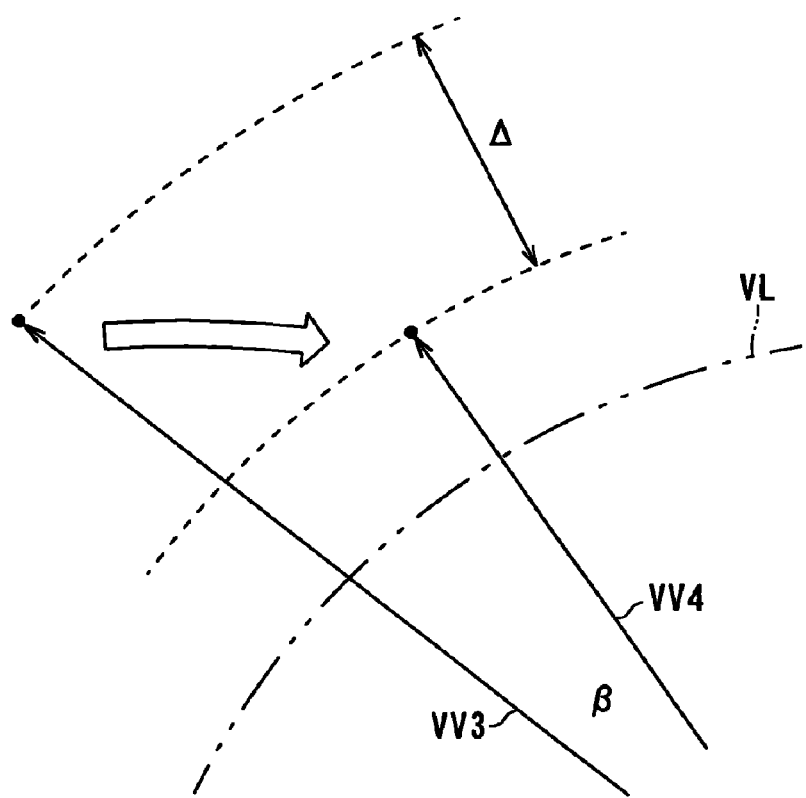
FIG. 9B is an enlarged view schematically illustrating a voltage vector estimated based on first target values of command voltages in d and q axes and stored in the controller according to the second embodiment.

FIG. 9B schematically illustrates a voltage vector VV3 estimated based on the first values of the command voltages vdce and vqce and stored in the controller 14. The controller 14 according to the second embodiment is configured to determine a threshold value Δ based on the amount of change in the norm of the estimated voltage vector VV3 in a period between the entrance of the current vector V1 in the switching area SA as the current vector V3 and the shift of the head of the current vector V1 (V3) to the point SP. The change in the norm of the estimated voltage vector VV3 is due to the change in the operating state of the motor-generator 10.

For this reason, as illustrated in FIG. 9B, when the estimated voltage vector is shifted from the voltage vector VV3 to a voltage vector VV4 so that the amount of change in the norm of the estimated voltage vector becomes the threshold value Δ, the norm of an actual voltage vector can be set to be lower than the value "VL−α".

Note that, in FIG. 9B, the norm of the voltage vector VV4 is longer than the limit voltage VL. This is based on the estimated deviation due to the inductances Ld and the Lq and the armature resistance R being constant.

However, in this case, when the voltage vector VV4 has the norm shifted from the norm of the voltage vector VV3 by the threshold value Δ, it is determined that the voltage vector VV4 is properly lower than the limit voltage VL assuming that the variations in each of the inductances Ld and the Lq and the armature resistance R are neglected.

A third switching routine from the field weakening control to the vector control to reduce the estimated deviation will be described hereinafter with reference to FIG. 10. The third switching routine is, for example, programmed in the controller 14 to be repeatedly executed thereby at a preset cycle during execution of the field weakening control.

Starting the third switching routine, the controller 14 computes, based on the present request torque Te, the point SP of intersection of the constant torque curve CT and the command-current curve CL illustrated in FIG. 9A in step S30.

Specifically, in step S30, the controller 14 sets a point of the first command current components idc and iqc in the d-q coordinate system as the point SP; these command current components idc and iqc are obtained by the command current setter 20 based on the present request torque Tc inputted thereto.

Next, the controller 14 establishes the switching area SA illustrated in FIG. 9A in step S32.

Specifically, in step S32, the controller 14 establishes first to fourth points P1, P2, P3, and P4 in the d-q coordinate system. The absolute value of the difference between a d-axis component of each of the first to fourth points P1 to P4 and the first d-axis command current component idc is equal to or lower than a preset value. Similarly, the absolute value of the difference between a q-axis component of each of the first to fourth points P1 to P4 and the first q-axis command current component iqc is equal to or lower than a preset value.

In step S34, the controller 14 determines whether a point of the actual d-axis and q-axis current components id and iq is located within the switching area SA.

Upon determining that the point of the actual d-axis and q-axis current components id and iq is not located within the switching area SA (NO in step S34), the controller 14 repeats the operations in steps S30, S32, and S34 until an affirmative determination is obtained in step S34.

Otherwise, upon determining that the point of the actual d-axis and q-axis current components id and iq is located within the switching area SA (YES in step S34), the controller 14 proceeds to step S36.

Figure 7:
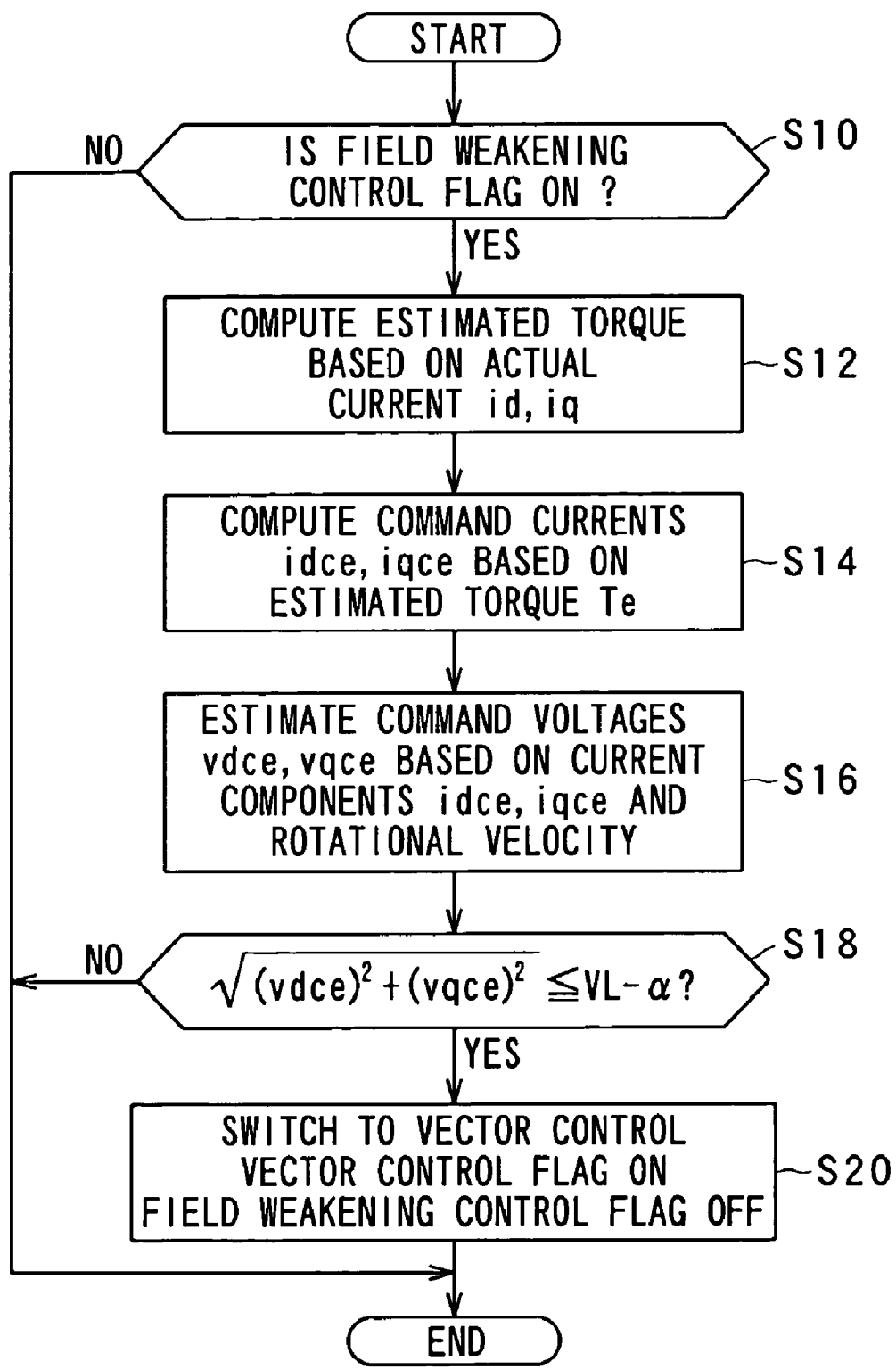
FIG. 7 is a flowchart schematically illustrating a second switching routine to be executed by the controller according to the first embodiment.

In steps S36, S38, and S40, the controller 14 carries out the operations in steps S12, S14, and S16 illustrated in FIG. 7, respectively.

When the operation in step S40 is completed, the controller 14 proceeds to step S42. In step S42, the controller 14 determines whether the norm, referred to as "Nrm", of the first values of the command voltages vdce and vqce has been stored in step S42; these first values of the command voltages vdce and vqce are estimated in step S40 immediately after it is determined that the point of the actual d-axis and q-axis current components id and iq is located within the switching area SA.

Upon determining that the norm has not been stored yet (NO in step S42), the controller 14 stores therein the norm Nrm of the first values of the command voltages vdce and vqce in step S44. Thereafter, the controller 14 returns to step S36.

Otherwise, upon determining that the norm has been stored (YES in step S42), the controller 14 goes to step S46.

In step S46, the controller 14 computes the difference between the norm of second values of the command voltages vdce and vqce actually estimated in step S40 and the norm Nrm stored therein, and determines whether the computed difference is equal to or greater than the threshold value Δ.

Upon determining that the computed difference is lower than the threshold value Δ (NO in step S46), returning to step S36, and otherwise (YES in step S46), the controller 14 switches the field weakening control to the vector control in step S48, and thereafter, terminates the deviation reducing routine.

Specifically, in FIG. 9B, the norm of the estimated voltage vector VV3 is stored in the controller 14 as the norm Nrm obtained immediately after it is determined that the head of the current vector V3 is located within the switching area SA (see "NO" in step S42 and S44).

Thereafter, during the field weakening control, the current vector V3 is changed to the current vector V2 so that the estimated voltage vector VV3 is changed to the estimated voltage vector VV4.

At that time, because the difference between the norm of the estimated voltage vector VV4 and the norm Nrm stored in the controller 14 is equal to or greater than the threshold value A (see FIG. 9B), it is determined to switch the field weakening control to the vector control even if the norm of the estimated voltage vector VV4 is greater than the subtraction of the preset value α from the limit voltage VL (the determination in step S18 is NO).

Thus, even if the actually estimated voltage vector VV4 is deviated, due to the change in the present state of the motor-generator 10, from a corresponding proper voltage vector with the norm located within the subtraction of the preset value α from the limit voltage VL, it is possible to properly determine the switching timing from the field weakening control to the vector control when the norm of the voltage vector VV4 is equal to or greater than the threshold value Δ.

This achieves, in addition to the first and third to seventh advantages, the eighth advantage of more effectively reducing torque changes if the field weakening control with a high voltage utilization factor is switched to the vector control with a low voltage utilization factor.

Moreover, the control system according to the second embodiment is configured to determine whether the amount of change in the norm of the command voltages vdce and vqce after the current vector based on the actual d-axis and q-axis current components id and iq has been located within the switching area SA.

This achieves the ninth advantage of determining, with high accuracy, whether the command voltages vdce and vqce required to generate, based on the vector control, the torque actually generated based on the field weakening control can maintain the controllability at a high level.

Third Embodiment

A control system according to the third embodiment of the present invention will be described hereinafter with reference to FIG. 11.

The structure of the control system according to the third embodiment is substantially identical to that of the control system according to the second embodiment except for the following different points. So, like parts between the control systems according to the second and third embodiments, to which like reference characters are assigned, are omitted or simplified in description.

A fourth switching routine from the field weakening control to the vector control will be described hereinafter with reference to FIG. 11. The fourth switching routine is, for example, programmed in the controller 14 to be repeatedly executed thereby at a preset cycle during execution of the field weakening control. Note that like operations between the third and fourth switching routines, to which like reference characters are assigned, are omitted or simplified in description.

Figure 11:
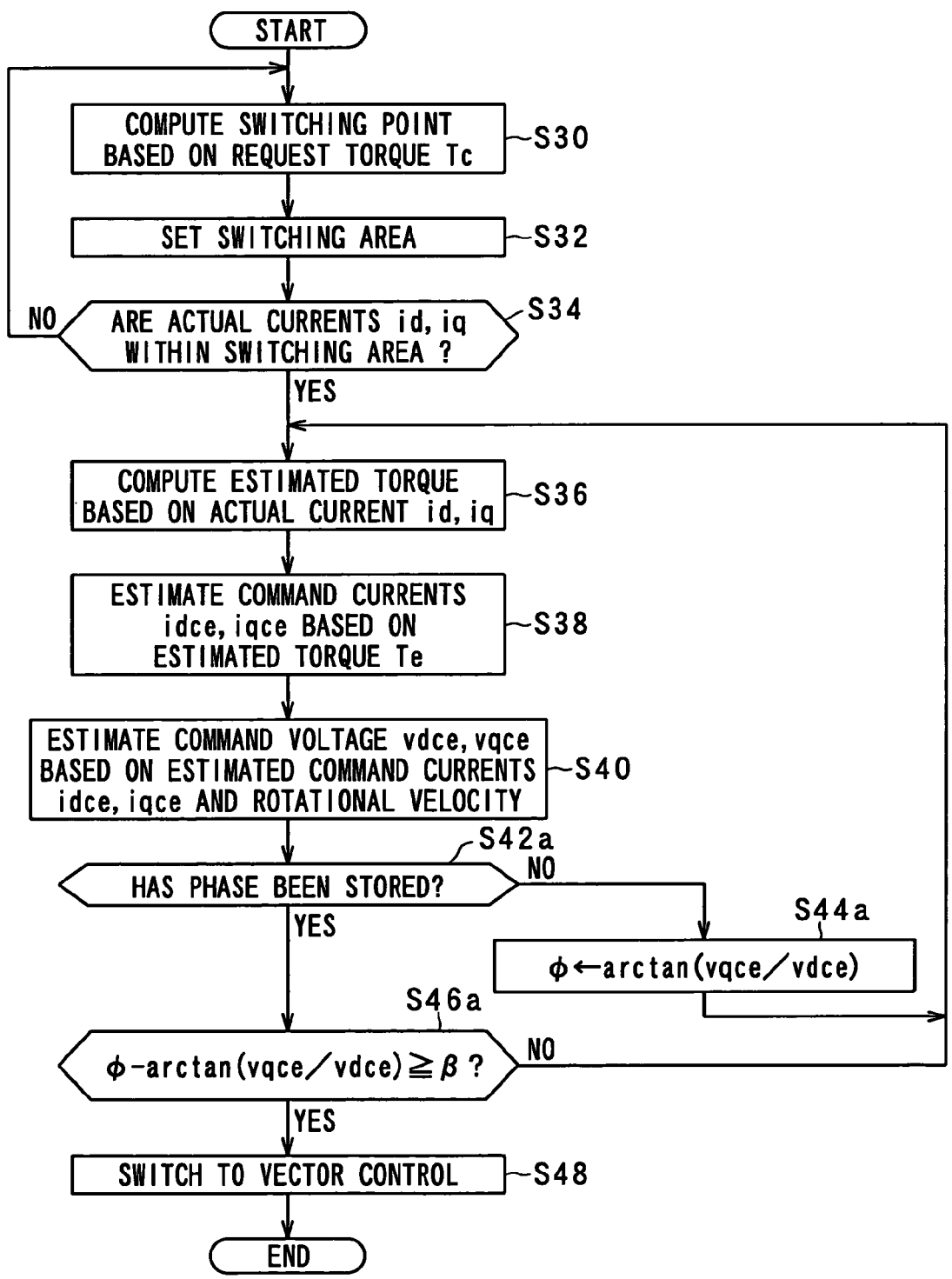
FIG. 11 is a flowchart schematically illustrating a fourth switching routine to be executed by the controller according to the third embodiment of the present invention.

As illustrated in FIG. 11, the controller 14 according to the third embodiment is configured to switch the filed weakening control to the vector control based on the amount of change in a phase of a command voltage vector of the estimated command voltages vdce and vqce after the current vector based on the actual d-axis and q-axis current components id and iq has been located within the switching area SA.

Specifically, upon determining that the point of the actual d-axis and q-axis current components id and iq is located within the switching area SA (YES in step S34), the controller 14 proceeds to step S36.

In steps S36, S38, and S40, the controller 14 carries out the operations in steps S12, S14, and S16 illustrated in FIG. 7, respectively.

When the operation in step S40 is completed, the controller 14 proceeds to step S42a.

In step S42a, the controller 14 determines whether the phase, referred to as "φ", of a command voltage vector of the estimated command voltages vdce and vqce has been stored; these command voltages vdee and vqce are estimated in step S40 immediately after it is determined that the point of the actual d-axis and q-axis current components id and iq is located within the switching area SA. Note that the phase φ of the command voltage vector of the command voltages vdce and vqce can be represented by the following equation [c6]:

$$\phi = \arctan(vqc1/vdc1) \quad [c6]$$

Upon determining that the phase φ has not been stored yet (NO in step S42a), the controller 14 stores therein the phase φ of the command voltage vector of the estimated command voltages vdce and vqce in step S44a. Thereafter, the controller 14 returns to step S36.

Otherwise, upon determining that the norm has been stored (YES in step S42a), the controller 14 goes to step S46a.

In step S46a, the controller 14 computes the difference between the phase of an alternative command voltage vector of the command voltages vdce and vqce actually estimated in step S40 and the phase φ stored therein, and determines whether the computed difference is equal to or lower than a threshold value β. The threshold value β is determined based on the amount of change in the phase of the estimated voltage vector VV3 in a period between the entrance of the current vector V1 in the switching area SA as the current vector V3 and the shift of the head of the current vector V1 (V3) to the point SP.

Upon determining that the computed difference is greater than the threshold value β (NO in step S46a), returning to step S36, and otherwise (YS in step S46a), the controller 14 switches the field weakening control to the vector control in step S48, and thereafter, terminates the deviation reducing routine.

Specifically, in FIG. 9B, the phase of the command voltage vector VV3 is stored in the controller 14 as the phase φ obtained immediately after it is determined that the head of the current vector V3 is located within the switching area SA (see "NO" in step S42a and S44a).

Thereafter, during the field weakening control, the current vector V3 is changed to the current vector V2 so that the command voltage vector VV3 is changed to delay in phase toward the command voltage vector VV4.

At that time, because the difference between the phase of the present command voltage vector VV4 and the phase φ stored in the controller 14 is equal to or lower than the threshold value β (see FIG. 9B), it is determined to switch the field weakening control to the vector control even if the norm of the command voltage vector VV4 is greater than the subtraction of the preset value α from the limit voltage VR (the determination in step S18 is NO).

Thus, even if the actually estimated command voltage vector VV4 is deviated, due to the change in the present state of the motor-generator 10, from a corresponding proper voltage vector with the norm located within the subtraction of the preset value α from the limit voltage VL, it is possible to properly determine the switching timing from the field weakening control to the vector control when the phase of the command voltage vector VV4 is equal to or lower than the threshold value β.

As described above, the control system according to the third embodiment is configured to determine, with high accuracy, whether the switching timing when the norm of the command voltages vdce and vqce after the current vector based on the actual d-axis and q-axis current components id and iq has been located within the switching area SA is proper based on the phase φ of the target values of the command voltages vdc1 and vqc1; this phase φ is used as a parameter associated with the command voltages vdce and vqce required to generate, based on the vector control, the torque actually generated based on the field weakening control This achieves the same effects as those obtained in the second embodiment.

Fourth Embodiment

Figure 12:
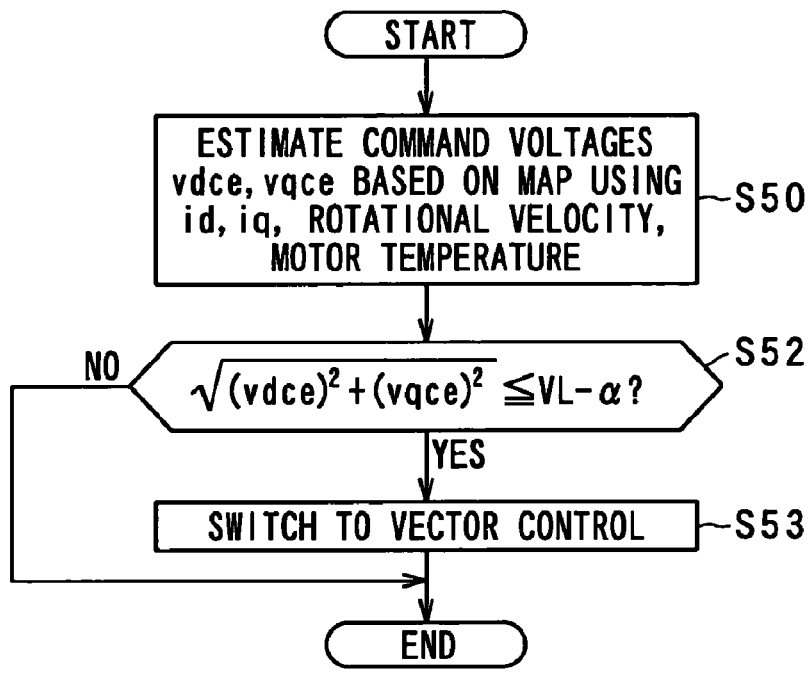
FIG. 12 is a flowchart schematically illustrating a fifth switching routine to be executed by the controller according to the fourth embodiment of the present invention.

A control system according to the fourth embodiment of the present invention will be described hereinafter with reference to FIG. 12.

The structure of the control system according to the fourth embodiment is substantially identical to that of the control system 50 according to the first embodiment except for the following different points. So, like parts between the control systems according to the first and fourth embodiments, to which like reference characters are assigned, are omitted or simplified in description.

Referring to FIG. 1, the control system according to the fourth embodiment is provided with a temperature sensor 80. The temperature sensor 80 is arranged in or close to the motor-generator 10 and operative to measure the temperature of the motor-generator 10. The temperature sensor 80 is also operative to send, to the controller 14, the measured temperature in data format. The temperature sensor 80 can be omitted from the control system 50 according to the first embodiment, but additionally added thereto.

The controller 14 according to the fourth embodiment stores therein a map M2 composed of, for example, a data table or a program. The map M2 represents a function (relationship) between a variable of each of the actual d-axis and q-axis current components id and iq, a variable of the rotational velocity ω, a variable of the temperature of the motor-generator 10, and a variable of each of the command voltages vdce and vqce required to generate, based on the vector control, the torque generated based on the field weakening control.

A fifth switching routine from the field weakening control to the vector control will be described hereinafter with reference to FIG. 12. The fifth switching routine is, for example, programmed in the controller 14 to be repeatedly executed thereby at a preset cycle during execution of the field weakening control.

Starting the fifth switching routine, in step S50, the controller 14 computes, based on the map M2, the controller 14 estimates the target values of the command voltages vdc1 and vqc1 corresponding to the input values of the parameters of each the actual d-axis and q-axis current components id and iq, the measured rotational velocity ω, and the measured temperature of the motor-generator 10.

The map M2 has been adapted in experiments such that the variable of each of the command voltages vdce and vqce required to generate, based on the vector control, the torque generated based on the field weakening control can be changed depending on the change in the operating state of the motor-generator 10, such as the change in each of the inductances Ld and Lq and the armature resistance R.

The map M2 allows the command voltages vdce and vqce to provide no estimated deviation while each of the inductances Ld and Lq and the armature resistance R is considered constant.

After completion of the operation in step S50, in steps S52 and S54, the controller 14 carries out the operations in steps S18 and S20 illustrated in FIG. 7, respectively.

This achieves, in addition to the first to seventh advantages, an advantage of more effectively reducing torque changes if the field weakening control with a high voltage utilization factor is switched to the vector control with a low voltage utilization factor.

Fifth Embodiment

Figure 13:
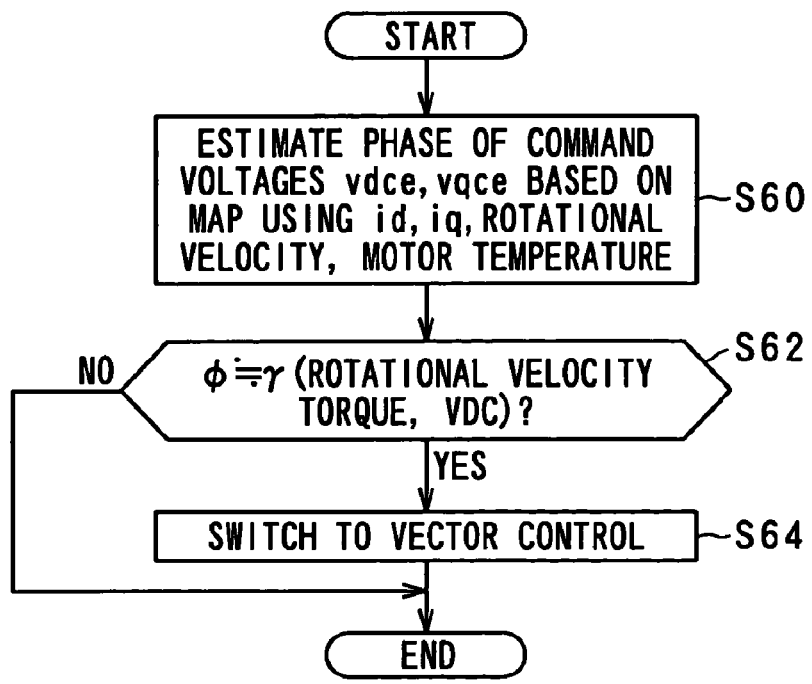
FIG. 13 is a flowchart schematically illustrating a sixth switching routine to be executed by the controller according to the fifth embodiment of the present invention.

A control system according to the fifth embodiment of the present invention will be described hereinafter with reference to FIG. 13.

The structure of the control system according to the fifth embodiment is substantially identical to that of the control system according to the fourth embodiment except for the following different points. So, like parts between the control systems according to the fourth and fifth embodiments, to which like reference characters are assigned, are omitted or simplified in description.

The controller 14 according to the fifth embodiment stores therein a map M3 composed of, for example, a data table or a program. The map M3 represents a function (relationship) between a variable of each of the actual d-axis and q-axis current components id and iq, a variable of the rotational velocity ω, a variable of the temperature of the motor-generator 10, and a variable of a target phase φ of a command vector of the command voltages vdce and vqce; this target phase φ is required to generate, based on the vector control, the torque generated based on the field weakening control.

The controller 14 according to the fifth embodiment also stores therein a map M4 composed of, for example, a data table or a program. The map M4 represents a function (relationship) between a variable of the estimated torque Te, a variable of the rotational velocity ω, a variable of the inverter input voltage VDC, and a phase parameter γ.

A sixth switching routine from the field weakening control to the vector control will be described hereinafter with reference to FIG. 13. The sixth switching routine is, for example, programmed in the controller 14 to be repeatedly executed thereby at a preset cycle during execution of the field weakening control.

Starting the sixth switching routine, in step S60, the controller 14 computes, based on the map M3, the target phase e of the command vector of the command voltages vdce and vqce. The estimated target phase φ corresponds to the input values of the parameters of each the actual d-axis and q-axis current components id and iq, the measured rotational velocity ω, and the measured temperature of the motor-generator 10.

The map M3 has been adapted in experiments such that the variable of the target phase φ of the command vector of the command voltages vdce and vqce required to generate, based on the vector control, the torque generated based on the field weakening control can be changed depending on the change in the operating state of the motor-generator 10, such as the change in each of the inductances Ld and Lq and the armature resistance R.

The map M3 allows the target phase φ of the command vector of the command voltages vdce and vqce to provide no estimated deviation while each of the inductances Ld and Lq and the armature resistance R is considered constant.

After completion of the operation in step S60, the controller 14 computes, based on the map M4, a value of the phase parameter γ; the computed value of the phase parameter γ corresponds to the input values of the parameters of the estimated torque Te, the rotational velocity ω, and the inverter input voltage VDC.

In step S60, the controller 14 determines whether the target phase φ is substantially in agreement with the computed value of the phase parameter γ. The operation in step S60 is to determine whether the vector control allows the motor-generator 10 to generate the torque generated by the field weakening control.

The determination in step S60 is needed because a power factor of the motor-generator 10 is variably set depending on the operating state of the motor-generator 10.

For this reason, the computed value of the phase parameter γ suitable to switch the field weakening control to the vector control is changed with change in the operating state of the motor-generator 10.

Thus, upon determining that the target phase φ is substantially in agreement with the computed value of the phase parameter γ, the controller 14 determines that the vector control allows the motor-generator 10 to generate the torque generated based on the field weakening control. Then, in step S64, the controller 14 carries out the operations in step S20 illustrated in FIG. 7.

This achieves the same advantage as the fourth embodiment.

Sixth Embodiment

A control system according to the sixth embodiment of the present invention will be described hereinafter with reference to FIGS. 14 to 18.

The structure of the control system according to the sixth embodiment is substantially identical to that of the control system 50 according to the first embodiment except for the following different points. So, like parts between the control systems according to the first and sixth embodiments, to which like reference characters are assigned, are omitted or simplified in description.

The control system according to the sixth embodiment is configured to learn an estimated deviation caused when each of the command voltages vdce and vqce estimated based on the model [c1] in order to generate, based on the vector control, the torque generated based on the field weakening control.

Specifically, in the sixth embodiment, the controller 14 is configured to estimate the d-axis command current component idce and the q-axis command current component iqce based on the estimated torque Te and the rotational velocity ω (see step S14). In addition, the controller 14 is configured to estimate the command voltages vdce and vqce in the d-q coordinate system based on the estimated torque Te and the rotational velocity ω (see step S16).

The deviation between the estimated command voltages vdce and vqce and the command voltages vdc1 and vqc1 inputted to the three-phase converter 30 represents the estimated deviation.

Thus, the control system according to the sixth embodiment is configured to correct the norm of the estimated command voltages vdce and vqce to thereby compensate the estimated deviation due to the change of parameters of the model [c1].

Figure 14:
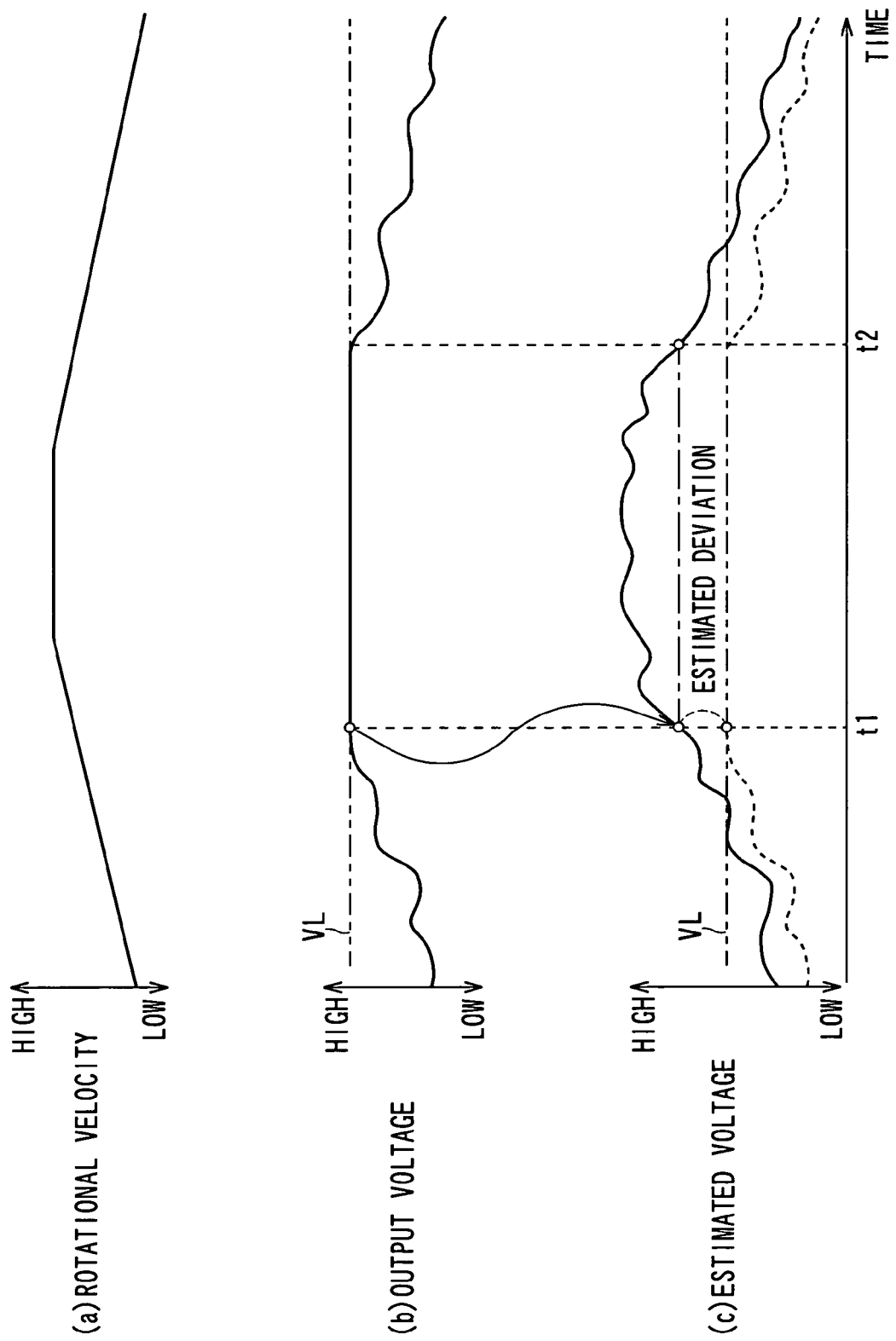
FIG. 14 is a view schematically illustrating a principal of switching the filed weakening control to the vector control according to the sixth embodiment of the present invention.

FIG. 14 schematically illustrates the principal of switching the filed weakening control to the vector control while compensating the estimated deviation.

Specifically, (a) of FIG. 14 represents a transition of the rotational velocity ω of the rotor, and (b) of FIG. 14 represents a transition of a norm of a voltage vector outputted form the inverter IV. The norm of the voltage vector outputted form the inverter IV will be referred to as "output voltage" hereinafter. In addition, (c) of FIG. 14 represents a transition of the norm of an estimated voltage vector based on the estimated command voltages vdce and vqce. The norm of the estimated voltage vector will be referred to as "estimated voltage" hereinafter.

As illustrated in (a) to (c) of FIG. 14, the controller 14 stores therein a value of the estimated voltage at time t1 at which the vector control is switched to the field weakening control when the output voltage reaches the limit voltage VL.

Specifically, at time t1, the estimated voltage is deviated from the output voltage by the estimated deviation due to the change of parameters of the model [c1].

Thus, in the sixth embodiment, even if the estimated voltage illustrated by a solid line is higher than the limit voltage VE at time t1 by the estimated deviation, the estimated voltage is stored in the controller 14 as the corrected estimated voltage that is in agreement with the limit voltage VL illustrated by a dashed line.

Thereafter, when the estimated voltage is lower than the stored voltage at time t2, the controller 14 switches the field weakening control to the vector control even if the actual estimated voltage illustrated by the a solid line does not reach the limit voltage VL.

This carries out the switching from the field weakening control to the vector control when the output voltage required to generate, based on the vector control, the torque generated based on the field weakening control is equal to or lower than the limit voltage VL.

However, the estimated deviation due to the change of the parameters of the model [c1] is changed with change in a current vector actually flowing in the motor-generator 10 and/or in the temperature of the motor-generator 10.

From the viewpoint, it is assumed that there are differences between:

the current vector flowing in the motor-generator 10 and the temperature thereof at the switching from the vector control to the field weakening control; and the current vector flowing in the motor-generator 10 and the temperature of the motor-generator 10 at the switching from the field weakening control to the vector control, respectively.

In this assumption, the norm of the estimated voltage vector may not be matched with a corrected value to compensate the estimated deviation due to the change of parameters of the model [c1].

Figure 15:
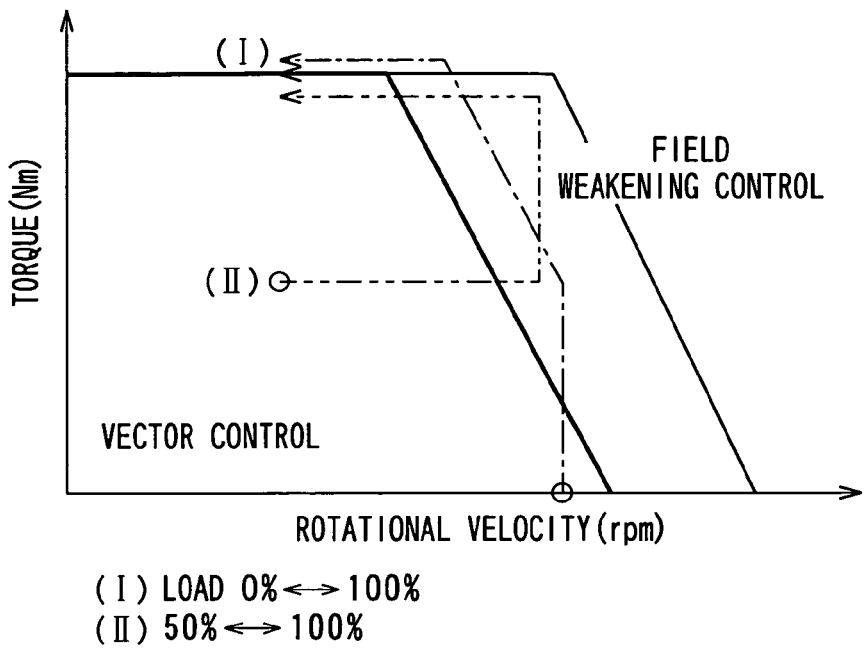
FIG. 15 is a graph schematically illustrating first and second switching examples according to the sixth embodiment.

Specifically, in FIG. 15, a first switching example (I) is illustrated by a chain line under the range between 0% load conditions and 100% load conditions. In the first switching example (I), the vector control is switched to the field weakening control in a higher rotational velocity and lower torque range. Thereafter, the field weakening control is switched to the vector control in a medium rotational velocity and higher torque range. In the first switching example, a current vector flowing in the motor-generator at the former switching and that flowing in the later switching are greatly different from each other. This may cause the estimated deviation to be changed.

A second switching example (II) is illustrated by a chain-double dashed line under the range between 50% load conditions and 100% load conditions. In the second switching example (II), the vector control is switched to the field weakening control in a higher rotational velocity and middle torque range. Thereafter, the field weakening control is switched to the vector control in a medium rotational velocity and higher torque range. In the second switching example, a current vector flowing in the motor-generator at the former switching and that flowing in the later switching are greatly different from each other. This also may cause the estimated deviation to be changed.

In order to achieve such a problem, the control system according to the sixth embodiment is configured to variably set the q-axis inductance Lq as one parameter of the model [c1] based on a current vector flowing in the motor-generator 10.

The reason why to variably set only the q-axis inductance Lq is as follows.

Specifically, because the field weakening control is carried out in a higher rotational velocity range, interference terms are dominant in the model [c1]. For this reason, the effects due to the change in the armature resistance in the model [c1] can be neglected, and therefore, the parameters of the d-axis inductance Ld, the q-axis inductance Lq, and the magnet flux linkage Φ can be changed.

Figure 16:
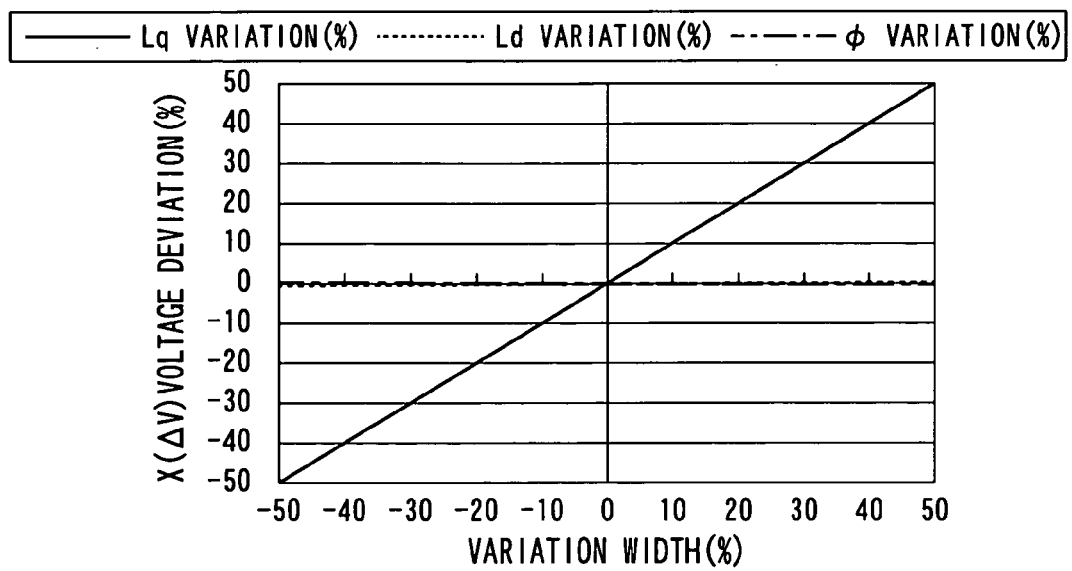
FIG. 16 is a graph schematically demonstrating calculation results of the change in the norm of the estimated voltage vector when any one of parameters of a d-axis inductance, a q-axis inductance, and a magnet flux linkage is changed according to the sixth embodiment.

FIG. 16 schematically demonstrates calculation results of the change in the norm of the estimated voltage vector when any one of the parameters of the d-axis inductance Ld, the q-axis inductance Lq, and the magnet flux linkage (is changed. Specifically, FIG. 16 illustrates a percentage of the amount of the ratio of the change in the norm of each of the estimated voltage vectors (VLq, VLd, Vφ) when a corresponding one of the parameters is changed to the change in the norm of the estimated voltage vector (Vref) when no parameters are changed.

As illustrated in FIG. 16, when the q-axis inductance Lq is changed, the estimated deviation is greatly changed (see a solid line), but when either the d-axis inductance Ld or the magnet flux linkage X is changed, the estimated deviation is little changed (see a broken line or a chain line).

For this reason, the variable setting of only the q-axis inductance Lq can suitably compensate the estimated deviation due to the change of parameters of the model [c1] while reducing the increase in the computing load of the controller 14.

The controller 14 according to the sixth embodiment stores therein a map M5 composed of, for example, a data table or a program. The map M5 represents a function (relationship) between a variable of the q-axis inductance Lq and a variable of an amplitude of a current vector based on the actual d-axis and q-axis current components id and iq.

Figure 18:
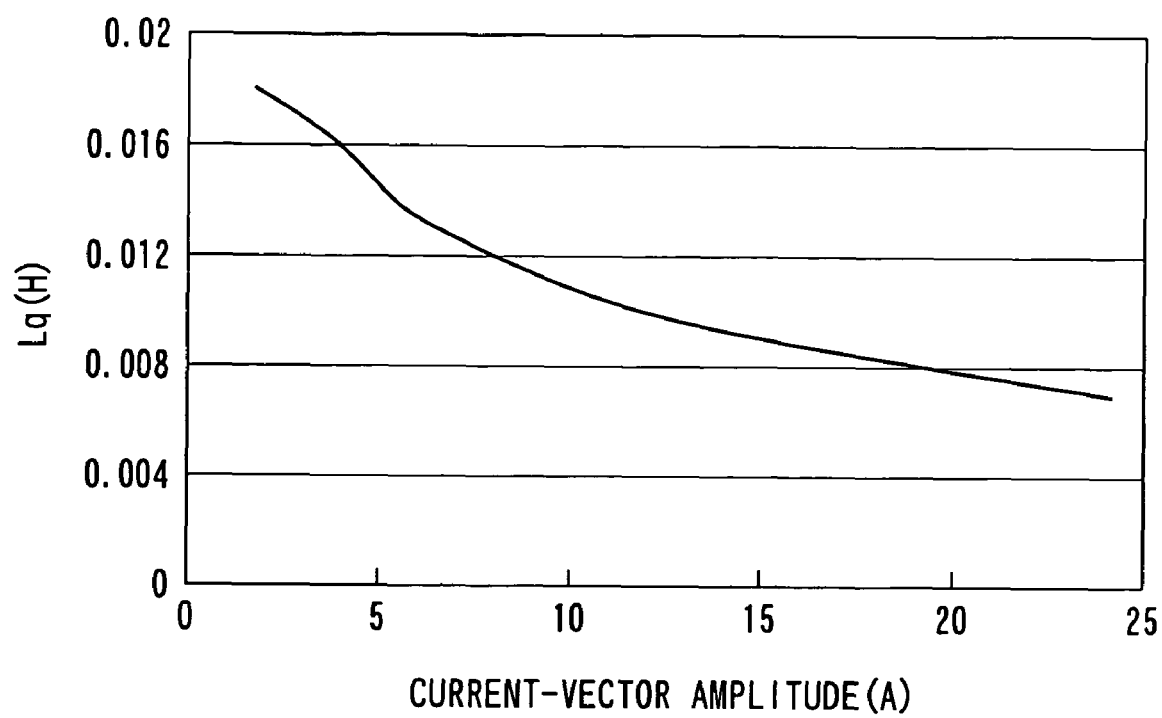
FIG. 18 is a view schematically illustrating a map according to the sixth embodiment.

For example, as illustrated in FIG. 18, the map M5 represented in graph format is designed such that, the higher the q-axis inductance Lq is, the lower the amplitude of the current vector is.

Figure 17:
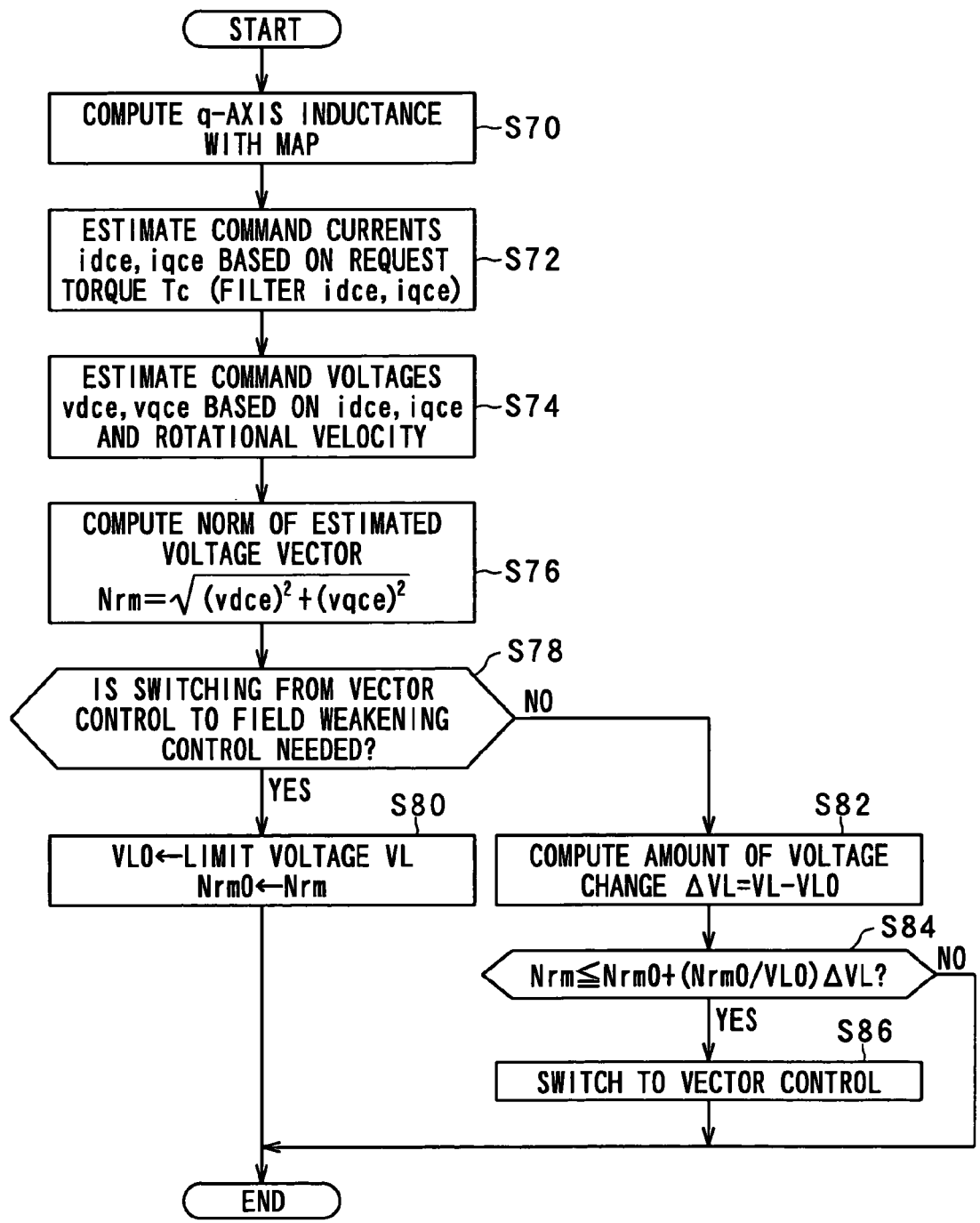
FIG. 17 is a flowchart schematically illustrating a seventh switching routine to be executed by the controller according to the sixth embodiment of the present invention.

A seventh switching routine from the field weakening control to the vector control will be described hereinafter with reference to FIG. 17. The seventh switching routine is, for example, programmed in the controller 14 to be repeatedly executed thereby at a preset cycle during execution of the field weakening control.

Starting the seventh switching routine, the controller 14 computes, based on the map M5, a value of the q-axis inductance Lq corresponding to the input value of the parameter of the amplitude of the current vector based on the actual d-axis and Praxis current components id and iq in step S70.

Next, the controller 14 estimates a d-axis command current component idce and a q-axis command current component iqce based on the request torque Tc in step S72. The operation in step S72 corresponds to that in step S14.

However, if the request torque Tc was changed suddenly, the change in the actual current vector would not follow the request-torque change. For this reason, a torque generated by the motor-generator 10 would not be matched with the request torque Tc.

Thus, in step S72, the controller 14 filters the estimated d and q-axis command current components idce and iqce and sets the filtered d and q-axis command current components idce and iqce to final d and q-axis command current components idce and iqce.

This achieves an advantage of estimating the d and q-axis command current components idce and iqce with high accuracy.

Next, in step S74, the controller 14 estimates, based on the estimated d-axis and q-axis command current components idce and iqce and the model [c1] with the computed value of the q-axis inductance Lq, the command voltage vdce in the d-axis and the command voltage vqce in a the q-axis.

In step S76, the controller 14 computes a norm Nrm of the estimated voltage vector of the command voltages vdce and vqce.

In step S78, the controller 14 determines whether the switching from the vector control to the field weakening control is needed. The operation in step S78 corresponds to that in step S4.

Upon determining that the switching from the vector control to the field weakening control is needed (YES in step S78), the controller 14 stores therein the limit voltage VL and the norm Nrm of the estimated voltage vector at that time as VL0 and Nrm0, respectively, in step S80.

Thus, the controller 14 learns an estimated deviation between the norm Nrm of the estimated voltage vector and the norm of the output voltage vector. Based on the determined estimated deviation at the present execution of the seventh switching routine, at the next execution of the seventh switching routine, the controller 14 computes the value of the q-axis inductance Lq at the next executions of the seventh switching routine so as to compensate the leaned deviation.

The repeated executions of the seventh routines allow the estimated deviation to be effectively compensated.

Otherwise, upon determining that the switching from the vector control to the field weakening control is not needed (NO in step S78), the controller 14 computes the amount ΔVL of change in the limit voltage VL in step SS2. The operation in step S82 is to compute the amount of change in the present limit voltage VL from the stored limit voltage VL0.

Next, in step S84, the controller 14 determines whether the switching from the field weakening control to the vector con control is needed. Specifically, in step S84, the controller 14 compares the present norm Nrm of the estimated voltage vector with a threshold value, and determines whether the present norm Nrm is equal to or lower than the threshold value.

The threshold value is obtained by correcting the stored norm Nrm0 by a value of the product of the amount ΔVL of change in the limit voltage VL and the ratio of the stored norm Nrm0 to the stored limit voltage VL0; this threshold value is represented by "Nrm0+(Nrm0/VL0)·ΔVL".

Note that the stored norm Nrm0 is proper as the threshold value when the voltage of the battery 12 is unchanged. The value "(Nrm0/VL0)·ΔVL" is a correction value for compensating the change in the norm of the estimated voltage vector due to the amount ΔVL of the change in the limit voltage VL corresponding to the amount of change in the voltage of the battery 12.

Upon determining that the present norm Nrm is equal to or lower than the threshold value (YES in step S84), the controller 14 switches the filed weakening control to the vector control in step S86; this operation in step S86 corresponds to that in step S20.

Otherwise, when the operation in step S80 or S86 is completed, or when the negative determination is executed in step S84, the seventh switching routine is exited.

As described above, the control system according to the sixth embodiment is configured to estimate the command voltages vdce and vqce required to generate, based on the vector control, a given torque while variably setting the q-axis inductance according to the current vector of the actual d-axis and q-axis current components id and iq flowing in the motor-generator 10

This achieves, in addition to the first to seventh advantages, the eleventh advantage of estimating, with high accuracy, the command voltages vdce and vqce based on the model [c1].

The control system according to the sixth embodiment is configured to learn the estimated deviation of the model [c1] based on the estimated voltage vector (the target values of the command voltages vdc1 and vqc1) at the switching from the vector control to the field weakening control. This achieves the twelfth advantage of learning, with high accuracy, the estimated deviation of the model [c1] at the switching from the vector control to the field weakening control. The control system is configured to suitably compensate, by the variable setting of the q-axis inductance, the effects due to the change in the parameters of the model [c1], thus improving the estimation accuracy of the model [c1].

The control system according to the sixth embodiment is configured to correct the norm of the estimated voltage vector at the switching from the vector control to the field weakening control by the amount of change in the present value of the battery voltage from a value thereof at the switching. This establishes the threshold value for determining whether the switching form the vector control to the field weakening control is needed. This achieves the thirteenth advantage of properly determining whether it is possible to effectively reduce, by the threshold value, torque changes caused by the switching from the field weakening control to the vector control.

The control system according to the sixth embodiment is configured to estimate the command voltages vdce and vqce based on the request torque Te and the rotational velocity ω. This achieves the fourteenth advantage of obtaining a torque based on the field weakening control while estimating the command voltages vdce and vqce.

The control system according to the sixth embodiment is configured to estimate the command current components idce and iqce that flow in each phase of the motor-generator 10 during the vector control to generate the request torque Te, and estimate, based on the rotational velocity ω, the t command voltages vdce and vqce required to cause the command current components idce and iqce to flow. This achieves the fifteenth advantage of properly estimating the command voltages vdce and vqce.

Seventh Embodiment

Figure 19:
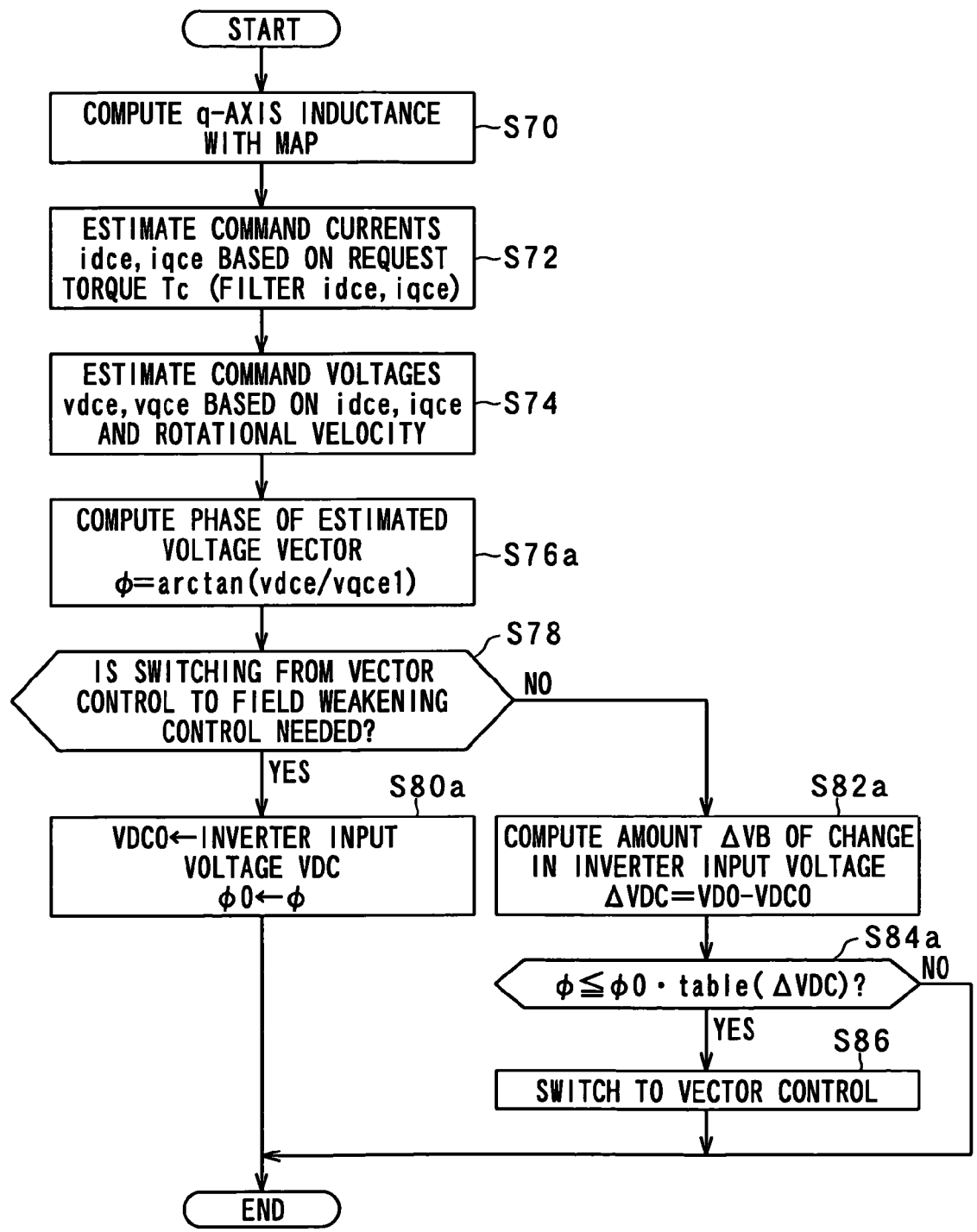
FIG. 19 is a flowchart schematically illustrating an eighth switching routine to be executed by the controller according to the seventh embodiment of the present invention.

A control system according to the seventh embodiment of the present invention will be described hereinafter with reference to FIG. 19.

The structure of the control system according to the seventh embodiment is substantially identical to that of the control system according to the sixth embodiment except for the following different points. So, like parts between the control systems according to the sixth and seventh embodiments, to which like reference characters are assigned, are omitted or simplified in description.

An eighth switching routine from the field weakening control to the vector control will be described hereinafter with reference to FIG. 19. The eighth switching routine is, for example, programmed in the controller 14 to be repeatedly executed thereby at a preset cycle during execution of the field weakening control. Note that like operations between the seventh and eighth switching routines, to which like reference characters are assigned, are omitted or simplified in description.

After the operation in step S74 is completed, in step S76a, the controller 14 computes a phase φ of the estimated voltage vector of command voltages vdce and vqce corresponding to the operation in step 42a.

In step S78a, the controller 14 determines whether the switching from the vector control to the field weakening control is needed. The operation in step S78a corresponds to that in step S4.

Upon determining that the switching from the vector control to the field weakening control is needed (YES in step S78a), the controller 14 stores therein the inverter input voltage VDC and the phase φ of the estimated voltage vector at that time as VDC0 and φ0, respectively, in step S80a.

Otherwise, upon determining that the switching from the vector control to the field weakening control is not needed (NO in step S78a), the controller 14 computes the amount ΔVDC of change in the inverter input voltage VDC in step SS2a. The operation in step S82a is to compute the amount of change in the present inverter input voltage IDC from the stored inverter input voltage VDC0.

Next, in step S84, the controller 14 compares the present phase φ of the estimated voltage vector with a threshold value, and determines whether the present phase φ is equal to or lower than the threshold value.

The threshold value is obtained by correcting the stored phase φ0 by a correction function table (ΔVDC); this threshold value is represented by "φ0·table (ΔVDC)".

The control system according to the seventh embodiment achieves the same advantage as the sixth embodiment.

Eighth Embodiment

Figure 20:
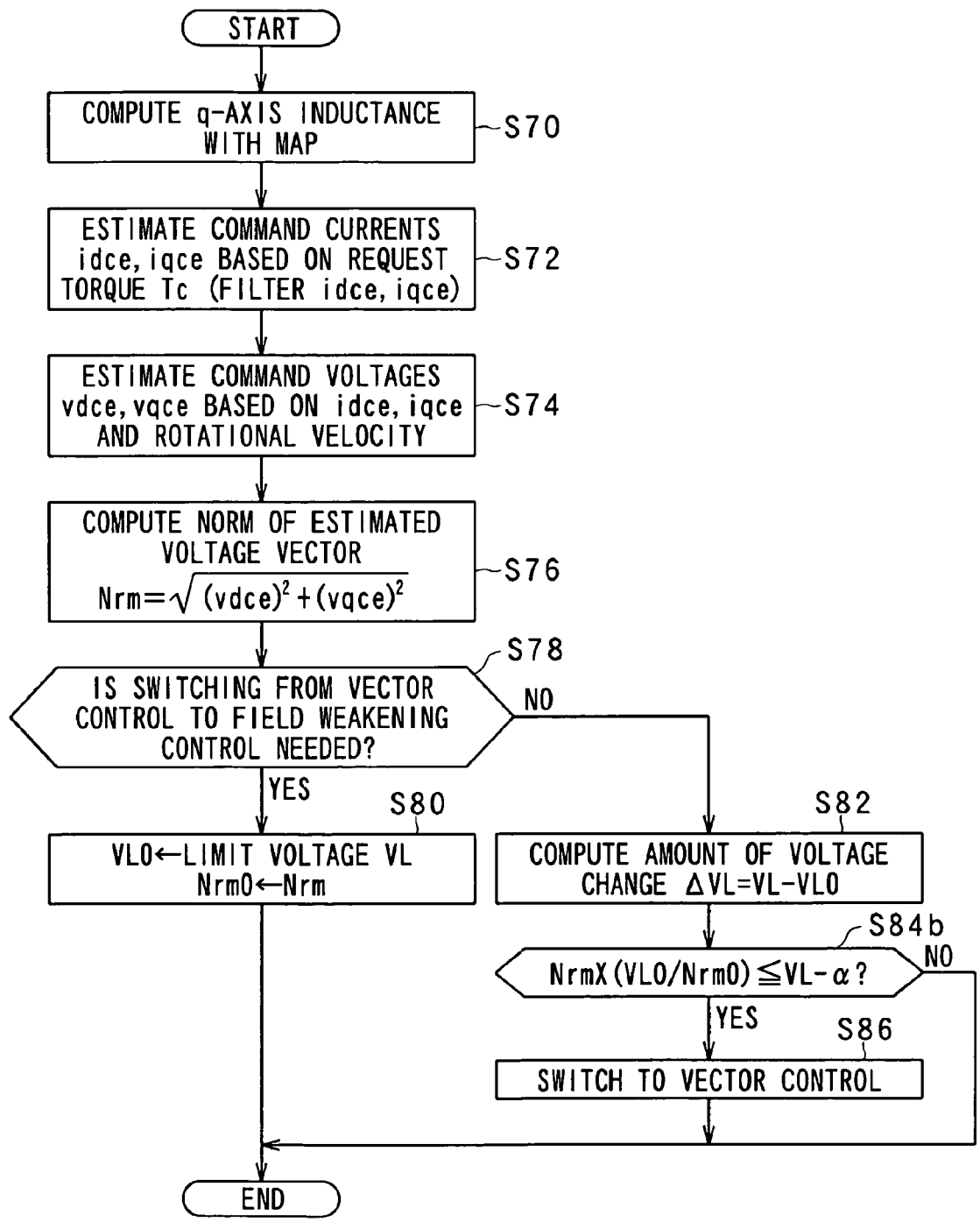
FIG. 20 is a flowchart schematically illustrating a ninth switching routine to be executed by the controller according to the eighth embodiment of the present invention.

A control system according to the eighth embodiment of the present invention will be described hereinafter with reference to FIG. 20.

The structure of the control system according to the eighth embodiment is substantially identical to that of the control system according to the sixth embodiment except for the following different points. So, like parts between the control systems according to the sixth and eighth embodiments, to which like reference characters are assigned, are omitted or simplified in description.

A ninth switching routine from the field weakening control to the vector control will be described hereinafter with reference to FIG. 20. The ninth switching routine is, for example, programmed in the controller 14 to be repeatedly executed thereby at a preset cycle during execution of the field weakening control. Note that like operations between the seventh and ninth switching routines, to which like reference characters are assigned, are omitted or simplified in description.

Upon determining that the switching from the vector control to the field weakening control is not needed (NO in step S78), the controller 14 determines whether a corrected value of the norm Nrm of the present estimated voltage vector is equal to or lower than the subtraction of the preset value a from the limit voltage VL to thereby determine whether the switching from the field weakening control to the vector control is needed in step S84b.

The correction of the present norm Nrm is obtained by multiplying the present norm Nrm by the ratio of the stored norm Nrm0 to the stored limit voltage VL0.

The corrected value is represented by "Nrm·(Nrm0/VL0)". The ratio "Nrm0/VL0" is a correction coefficient to compensate the change in the norm of the estimated voltage vector due to the amount ΔVL of change in the voltage of the battery 12.

The control system according to the eighth embodiment achieves the same advantage as the sixth embodiment.

Ninth Embodiment

Figure 21:
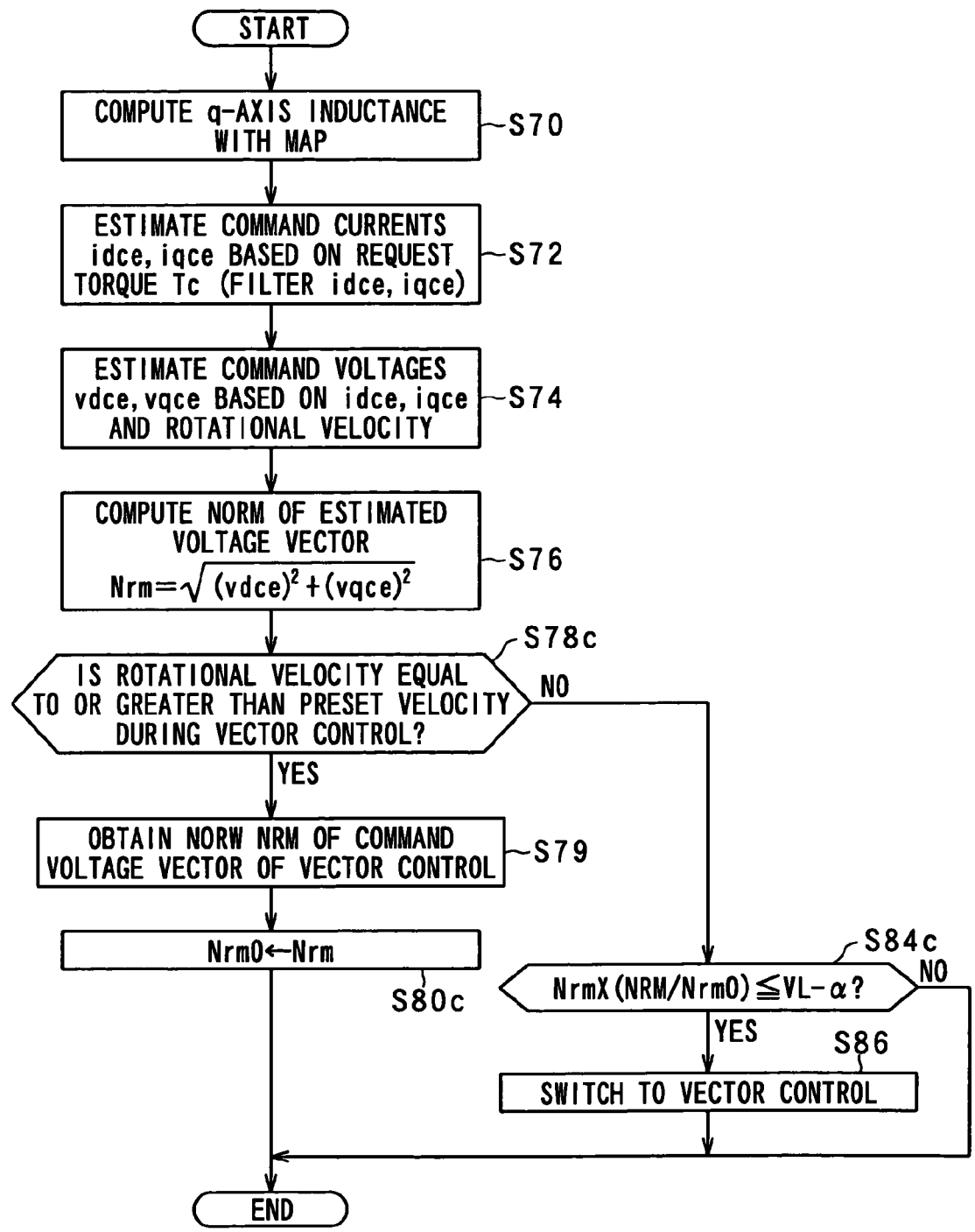
FIG. 21 is a flowchart schematically illustrating a tenth switching routine to be executed by the controller according to the ninth embodiment of the present invention.

A control system according to the ninth embodiment of the present invention will be described hereinafter with reference to FIG. 21.

The structure of the control system according to the ninth embodiment is substantially identical to that of the control system according to the sixth embodiment except for the following different points. So, like parts between the control systems according to the sixth and ninth embodiments, to which like reference characters are assigned, are omitted or simplified in description.

A tenth switching routine from the field weakening control to the vector control will be described hereinafter with reference to FIG. 21. The tenth switching routine is, for example, programmed in the controller 14 to be repeatedly executed thereby at a preset cycle during execution of the field weakening control. Note that like operations between the seventh and tenth switching routines, to which like reference characters are assigned, are omitted or simplified in description.

After completion of the operation in step S76, in step S78c, the controller 14 determines whether the learning of the estimated deviation can be carried out. Specifically, the controller 14 determines whether the rotational velocity ω is equal to or greater than a preset velocity during the vector control in step S78c.

Note that the condition of the rotational velocity ω being equal to or greater than the preset velocity is based on the fact that the model [c1] with the variably set q-axis inductance using the map M5 is applied in a higher rotational velocity range Specifically, as described above, the change in the estimation accuracy due to the change in the q-axis inductance is dominant in a higher rotational velocity range in which the interference terms in the model [c1] are dominant. For this reason, the determination of whether the rotational velocity ω is within a higher rotational velocity range is carried out in step S78c. In addition, the condition of whether the vector control is being carried out is to obtain values to be compared with estimated values of the model [c1].

Upon determining that the rotational velocity ω is equal to or greater than the preset velocity during the vector control (YES in step S78c), the controller 14 obtains a norm NRM of the normal values of the command voltages vdc1 and vqc1 inputted to the three-phase converter 30 in step S79. Next, in step S80c, the controller 14 stores therein the norm Nrm of the estimated voltage vector at that time as Nrm0.

Thus, the controller 14 learns an estimated deviation between the norm Nrm of the estimated voltage vector and the norm of the output voltage vector. Based on the determined estimated deviation at the present execution of the seventh switching routine, at the next execution of the seventh switching routine, the controller 14 computes the value of the q-axis inductance Lq at the next executions of the seventh switching routine so as to compensate the leaned deviation.

The repeated executions of the seventh routines allow the estimated deviation to be effectively compensated.

Otherwise, upon determining that the rotational velocity ω is lower than the preset velocity during the vector control (NO in step S78c), the controller 14 determines whether a corrected value of the norm Nrm of the present estimated voltage vector is equal to or lower than the subtraction of the preset value α from the limit voltage VL to thereby determine whether the switching from the field weakening control to the vector control is needed in step S84c.

The correction of the present norm Nrm is obtained by multiplying the present norm Nrm by the ratio of the norm NRM stored in step S79 to the norm Nrm0 stored in step S80c.

The corrected value is represented by "Nrm·(NRM/Nrm0)". The ratio "NRM/Nrm0" is a correction coefficient to compensate the estimated deviation.

The control system according to the ninth embodiment achieves the same advantage as the sixth embodiment.

Tenth Embodiment

Figure 22:
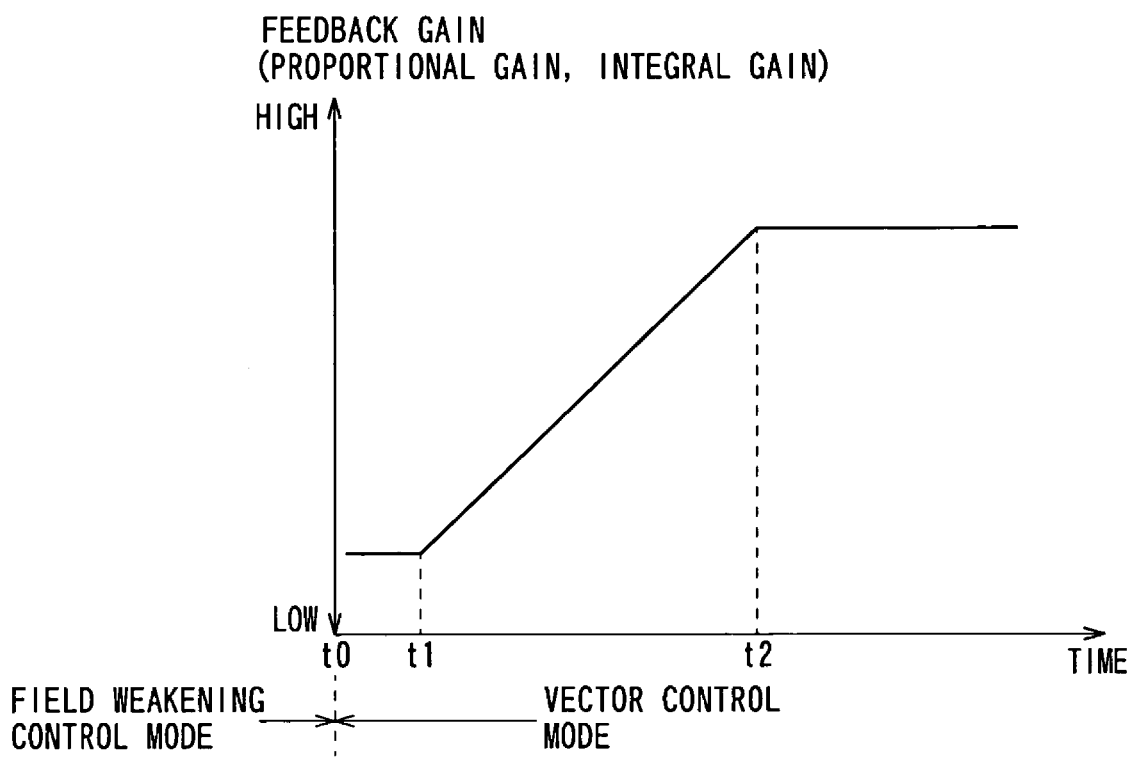
FIG. 22 is a graph schematically illustrating a transition of a feedback gain over time according to the tenth embodiment of the present invention.

A control system according to the tenth embodiment of the present invention will be described hereinafter with reference to FIG. 22.

The structure of the control system according to the tenth embodiment is substantially identical to that of the control system 50 according to the first embodiment except for the following different points. So, like parts between the control systems according to the first and tenth embodiments, to which like reference characters are assigned, are omitted or simplified in description.

When the field weakening control is switched to the vector control, the norm of the vector of the target values of the command voltages vdc1 and vqc1 is set to be equal to or lower than the limit voltage VL. However, it can be desired to increase the limit voltage VL over the voltage utilization factor of 0.71. However, in this case, the controllability of the vector control in a range in which the field weakening control is switched to the vector control may be reduced from the controllability of the vector control in a range in which the voltage utilization factor is equal to or lower than 0.71.

For this reason, a value of the feedback gain (each of the proportional gain and the integral gain) of the command voltage setter 28 adapted in the range in which the voltage utilization factor is equal to or lower than 0.71 may be excessively high. This may cause the output voltage of the inverter IV to fluctuate due to the switching from the field weakening control to the vector control.

Thus, the control system according to the tenth embodiment is configured to limit the feedback gain immediately after the switching from the field weakening control to the vector control.

Specifically, during a preset period from time t0 to time t1 immediately after the switching from the field weakening control to the vector control, the command voltage setter 28 maintains the feedback gain at a low value. Thereafter, the command voltage setter 28 gradually increases the feedback gain. After a preset period from time t0 to time t2 has elapsed, the command voltage setter 28 fixes the feedback gain at a constant value.

The control system according to the tenth embodiment is configured to gradually increase the feedback gain in the vector control immediately after the switching from the field weakening control to the vector control. This achieves, in addition to the first to seventh advantages, the sixteenth advantage of suitably reducing the fluctuations of the command voltages due to the switching from the field weakening control to the vector control, thus smoothly carrying out the switching.

The first to tenth embodiments and their modifications can be changed and/or modified within the scope of the present invention.

In each of the first to fifth embodiments and the tenth embodiment, the command voltages vdce and vqce are calculated using the actual d-axis and q-axis current components id and iq as parameters correlated with a torque generated by the motor-generator 10. However, the present invention is not limited to the structure. Specifically, the command voltages vdce and vqce can be calculated using another parameter, such as the request torque Tc correlated with a torque generated by the motor-generator 10.

In each of the sixth to ninth embodiments, the command voltages vdce and vqce are calculated using the request torque Tc, but the present invention is not limited thereto. Specifically, the command voltages vdce and vqce can be calculated using another parameter, such as the actual d-axis and q-axis current components id and iq as parameters correlated with a torque generated by the motor-generator 10.

In the second and third embodiments, the distance between the point SP and the boundaries of the area SA can be variably set.

In the sixth to eighth embodiments, the estimated deviation of the model is learned every time the vector control is switched to the field weakening control. Similarly, in the ninth embodiment, the estimated deviation of the model is learned every time the rotational velocity is equal to or greater than the preset rotational velocity. The present invention is however not limited to the structures.

Specifically, once the estimated deviation of the model is learned when the vector control is switched to the field weakening control, the control system can prevent further learning of the estimated deviation until the running distance of the hybrid vehicle is equal to or greater than a preset value. In this modification, using the result of the learning of the estimated deviation can estimate, with high accuracy, the value of at least one parameter correlated with voltages required to generate, by the vector control, the torque generated based on the field weakening control.

Even if the q-axis inductance is fixed, the learning of the estimated deviation for each value of the torque generated based on the field weakening control can determine the switching timing from the field weakening control to the vector control while compensating the estimated deviation of the model.

The different points according to the tenth embodiment can be applied to at least one of the second to ninth embodiments.

Parameters associated with a voltage required as a command value to generate, based on the vector control, the torque generated based on the field weakening control are not limited to the parameters described in the first to tenth embodiments. For example, a d-axis command voltage can be used as one of the parameters.

As the vector control, the two-phase modulation cannot be carried out. In this modification, it is preferable that the limit voltage is set to the order of the norm of a two-dimensional voltage vector when the modulation factor is set to 1. In other words, it is preferable that the limit voltage is set to a value when an average frequency of each of the drive signals is equal to or lower than the frequency of the carrier wave.

Means for estimating a value of a parameter associated with a voltage required to generate, by one control unit, such as the vector control unit, a torque generated by an alternative one control unit, such as the field weakening control unit, cannot be limited to various means described in the first to tenth embodiments. Specifically, means for estimating the peak value of each phase voltage can be used as the estimating means.

In each of the first to tenth embodiments and their modifications, the command voltages vdc1 and vqc1 can be directly used as the command voltages vdc and vqc, but the present invention is not limited thereto. Specifically, application of a non-interacting term as a feedforward term to the command voltages vdc1 and vqc1 can calculate the command voltages vdc and vqc.

In each of the first to tenth embodiments and their modifications, the command voltage setter 28 can carry out an integral feedback algorithm or a proportional-integral-derivative feedback algorithm in place of the proportional integral feedback algorithm.

In the first to tenth embodiments and their modifications, there are disclosed various means for setting, based on a first command voltage in the first axis of two-dimensional coordinate system according to a command current in the first axis and an input voltage, a second command voltage in the second axis of the two-dimensional coordinate system. The various means aim at controlling a torque associated with the motor-generator based on only the command current in the first axis. However, the present invention is not limited to the various means.

Specifically, means for setting, based on a first command voltage in a fist axis of a fixed two-phase coordinate system (α and β coordinate system) according to a command current in the first axis and an input voltage, a second command voltage in the second axis of the two-dimensional coordinate system can be used as one of the various means. This aims at controlling a torque associated with the motor-generator based on only the command current in the first axis.

Means for controlling a request torque to the motor-generator or a torque to be generated thereby in a range in which the voltage utilization factor is higher than that during the vector control cannot be limited to examples described in the first to tenth embodiments and their modifications.

Specifically, various means for carrying out the field weakening control or means for carrying out the single-pulse control described in the BACKGROUND OF THE INVENTION can be used as the means for controlling the request torque or the torque to be generated by the motor-generator 10.

The rotational velocity ω can be used as controlled variables of the motor-generator 10 in place of or in addition to a torque of the motor-generator 10. When the output voltage is saturated during a higher rotational velocity range, the field weakening control is preferably used to improve the controllability of the inverter IV, and during a lower rotational velocity range, the vector control is preferably used to improve the controllability of the inverter IV. Thus, the present invention can be applied when the switching between the vector control and the field weakening control is carried out.

In each of the first to tenth embodiments and their modifications, as the salient-pole rotary machine, an IPMSM is used, but another type of salient-pole rotary machines, such as a Synchronous Reluctance Motor, can be used.

In each of the first to tenth embodiments and their modifications, a salient-pole motor is used, but a non salient-pole rotary machine can be used.

Various types of rotary machines according to the present invention can be installed in various types of vehicle, such as an electric automobile. Various types of rotary machines to which the present invention can be applied are not limited to a component of a drive system of vehicles.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An apparatus for driving a switching member of a power converter so as to generate, from an inputted DC (Direct Current) voltage, a variable output voltage of the power converter, the output voltage being applied to a rotary machine and adjusting a controlled variable of the rotary machine, the apparatus comprising:
   a first drive unit configured to drive, in a first range of a voltage utilization factor, the switching member of the power converter to thereby control the output voltage of the power converter to be matched with a command voltage, the voltage utilization factor being defined based on a ratio of the output voltage to the inputted DC voltage;
   a second drive unit configured to drive, in a second range of the voltage utilization factor, the switching member to thereby generate a value of the controlled variable of the rotary machine, the second range of the voltage utilization factor being higher than the first range thereof; and
   an estimating unit configured to estimate, during the switching member being driven by the second drive unit, a value of a parameter associated with the output voltage of the power converter, the estimated value of the parameter being required for the first drive unit to generate the value of the controlled variable generated by the second drive unit.

2. The apparatus according to claim 1, wherein the rotary machine has a two-phase rotating coordinate system with a d-axis and a q-axis, the d-axis being in line with a direction of magnetic flux created by the rotary machine, the q-axis being electromagnetically orthogonal to the d-axis, and the estimating unit is configured to estimate the value of the parameter based on an equation model describing the rotary machine, the equation model including a first inductance in the d-axis and a second inductance in the q-axis, the estimating unit being configured to variably set the second inductance of the equation model according to a current flowing in the rotary machine based on the output voltage of the power converter.

3. The apparatus according to claim 2, further comprising:
a deviation learning unit configured to learn a deviation of the equation model from a normal state based on the estimated value of the parameter and an actual value of the parameter, the actual value of the parameter being during the output voltage of the power converter being controlled by the first drive unit to be matched with the command voltage.

4. The apparatus according to claim 3, wherein the rotary machine has a rotor and is configured to rotate the rotor based on the output voltage of the power converter, and the deviation learning unit is configured to:
measure a rotational velocity of the rotor of the rotary machine; and
learn the deviation of the estimated value of the parameter from the actual value of the parameter when the rotational velocity of the rotor is equal to or higher than a preset value.

5. The apparatus according to claim 1, further comprising:
a deviation learning unit configured to learn a deviation of the estimated value of the parameter from an actual value of the parameter, the actual value of the parameter being during the output voltage of the power converter being controlled by the first drive unit to be matched with the command voltage.

6. The apparatus according to claim 5, further comprising:
a first switching unit configured to:
determine whether, during the switching member being driven by the second drive unit, the output voltage of the power converter is equal to or lower than a first preset value; and
switch, when it is determined that the output voltage of the power converter is equal to or lower than the first preset value, the drive of the switching member of the power converter from the second drive unit to the first drive unit based on a result of the learning of the deviation learning unit and the estimated value of the parameter.

7. The apparatus according to claim 6, further comprising:
a second switching unit configured to:
determine whether, during the output voltage of the power converter being controlled by the first drive unit to be matched with the command voltage, the output voltage of the power converter is equal to or lower than a second preset value; and
switch, when it is determined that the output voltage of the power converter is equal to or lower than the second preset value, the drive of the switching member of the power converter from the first drive unit to the second drive unit,
wherein the deviation learning unit is configured to learn the deviation of the estimated value of the parameter from the actual value of the parameter when the drive of the switching member of the power converter is switched from the first drive unit to the second drive unit by the second switching unit, and
the first switching unit is configured to:
compare the estimated value of the parameter by the estimating unit with a threshold value;
determine whether the output voltage of the power converter is equal to or lower than the first preset value based on a result of the comparison; and
set the threshold value based on: the deviation of the estimated value learned by the deviation learning unit, a value of the inputted DC voltage at a time when the deviation of the estimated value is learned by the deviation learning unit, and a present value of the inputted DC voltage.

8. The apparatus according to claim 1, wherein the first drive unit is configured to drive the switching member of the power converter based on the command voltage, the command voltage serving as a manipulated variable to adjust, to a command value, a value of a current flowing in the rotary machine based on the output voltage of the power converter, further comprising:
a determining unit configured to determine, during the switching member being driven by the second drive unit, whether the value of the current flowing in the rotary machine enters a region around the command value of the current; and
a switching unit configured to switch the drive of the switching member of the power converter from the second drive unit to the first drive unit based on an amount of change of the estimated value of the parameter from when it is determined that the value of the current flowing in the rotary machine enters the region around the command value of the current.

9. The apparatus according to claim 1, wherein the rotary machine has a rotor and is configured to rotate the rotor based on the output voltage of the power converter, further comprising:
a switching unit configured to:
determine whether, during the switching member being driven by the second drive unit, the output voltage of the power converter is equal to or lower than a preset value; and
switch, when it is determined that the output voltage of the power converter is equal to or lower than the preset value, the drive of the switching member of the power converter from the second drive unit to the first drive unit based on the estimated value of the parameter,
wherein the estimating unit includes a map, the map defining a relationship at least between: a variable of a rotational velocity of the rotor, a variable of a current flowing in the rotary machine, and the parameter, and is configured to estimate the value of the parameter based on the map.

10. The apparatus according to claim 9, wherein the map defines the relationship at least between: the variable of the rotational velocity of the rotor, the variable of the current flowing in the rotary machine, a variable of a temperature of the rotary machine, and the parameter, and is configured to estimate the value of the parameter based on the map.

11. The apparatus according to claim 6, wherein the first drive unit is configured to:
set a value of the command voltage as a manipulated variable to feedback control a current flowing in the rotary machine to be matched with a command value; and
drive the switching member of the power converter based on the value of the command voltage, further comprising:
a feedback-gain increasing unit configured to increase a gain of the feedback control when the drive of the switching member of the power converter is switched from the second drive unit to the first drive unit by the switching unit.

12. The apparatus according to claim 1, wherein the rotary machine has a rotor and is configured to rotate the rotor based on the output voltage of the power converter, and the estimating unit is configured to estimate, during the switching member being driven by the second drive unit, the value of the parameter associated with the output voltage of the power converter based on a torque associated with the rotation of the rotor and a rotational velocity of the rotor.

13. The apparatus according to claim 12, wherein the rotary machine is designed to be a multiphase rotary machine, the first drive unit is configured to:
   set a value of the command voltage as a manipulated variable to feedback control a current flowing in the rotary machine to be matched with a command value; and
   drive the switching member of the power converter based on the value of the command voltage, and
   the estimating unit comprises:
   a first estimator configured to estimate any one of a value of a current to flow in each phase of the rotary machine and a value equivalent to the value of the current when the value of the controlled variable generated by the second drive unit is generated by the first drive unit; and
   a second estimator configured to estimate the value of the parameter based on the rotational velocity of the rotor, the estimated value of the parameter being required to cause any one of the value of the current and the value equivalent thereto to flow in each phase of the rotary machine.

14. The apparatus according to claim 1, wherein the rotary machine is designed to be a multiphase rotary machine having a rotor and is configured to rotate the rotor based on the output voltage of the power converter, and the estimating unit is configured to estimate, during the switching member being driven by the second drive unit, the value of the parameter associated with the output voltage of the power converter based on a value of a current flowing in each phase of the rotary machine and a rotational velocity of the rotor.

15. The apparatus according to claim 14, wherein the estimating unit comprises:
   a first estimator configured to estimate an actual torque generated by the rotary machine based on the value of the current;
   a second estimator configured to estimate any one of the value of the current to flow in each phase of the rotary machine and a value equivalent to the value of the current when the value of the controlled variable generated by the second drive unit is generated by the first drive unit; and
   a third estimator configured to estimate the value of the parameter based on the rotational velocity of the rotor, the estimated value of the parameter being required to cause any one of the value of the current and the value equivalent thereto to flow in each phase of the rotary machine.

16. The apparatus according to claim 1, wherein the second drive unit is configured to drive, in the second range of the voltage utilization factor, the switching member to thereby achieve a value of the voltage utilization factor between a value of the voltage utilization factor achieved by the first drive unit and a value of the voltage utilization factor achieved based on single-pulse control.

17. The apparatus according to claim 1, wherein the variable output voltage is an AC (Alternating Current) voltage, and the second drive unit is configured to drive the switching member to alternately apply a positive part of the AC voltage and a negative part thereof to the rotary machine within one electric angular frequency while controlling a phase of a current flowing in the rotary machine.

18. The apparatus according to claim 1, wherein the first drive unit is configured to control a phase of a current flowing in the rotary machine such that the phase is matched with a preset value, the preset value being determined for each target value of the controlled variable.

19. A control system comprising:
   the power converter according to claim 1; and
   the apparatus according to claim 1.

* * * * *